US005384597A

United States Patent [19]

Sameshima et al.

[11] Patent Number: 5,384,597

[45] Date of Patent: Jan. 24, 1995

[54] IMAGE PICKUP TUBE UTILIZING THIRD ELECTRODE AND ITS OPERATING METHOD

[75] Inventors: Kenji Sameshima, Hachioji; Tatsuo Makishima, Tokyo; Tadaaki Hirai, Koganei; Yukio Takasaki, Mobara; Misao Kubota, Kawasaki; Kenkichi Tanioka, Tokyo; Keiichi Shidara, Tama, all of Japan

[73] Assignees: Hitachi, Ltd.; Nippon Hoso Kyokai, both of Tokyo, Japan

[21] Appl. No.: 701,508

[22] Filed: May 16, 1991

[30] Foreign Application Priority Data

May 23, 1990 [JP] Japan .................................. 2-131300

[51] Int. Cl.$^6$ .............................................. H04N 3/30

[52] U.S. Cl. ...................................... 348/325; 313/106

[58] Field of Search ............... 358/217, 218, 219, 229; 313/384, 386, 387, 390, 106, 107, 377, 389; H04N 3/30; 348/325, 326, 327, 329, 330, 331

[56] References Cited

U.S. PATENT DOCUMENTS

| | | | |
|---|---|---|---|
| 4,135,210 | 1/1979 | Limper et al. | 358/217 |
| 4,166,969 | 9/1979 | Hoeberechts | 313/371 |
| 4,609,846 | 9/1986 | Kusano et al. | 313/384 |
| 4,636,682 | 1/1987 | Kusano et al. | 313/386 |
| 4,716,468 | 12/1987 | Maruyama et al. | 358/219 |
| 4,970,429 | 11/1990 | Franken | 313/384 |
| 5,021,205 | 6/1991 | Yamamoto et al. | 313/106 |

FOREIGN PATENT DOCUMENTS

| | | | |
|---|---|---|---|
| 108385 | 5/1984 | European Pat. Off. | H01J 29/45 |
| 381189 | 8/1990 | European Pat. Off. | H01J 31/38 |
| 3917139 | 11/1989 | Germany | H01J 31/28 |
| 38-72037 | 4/1963 | Japan | H01J 29/45 |
| 60-198039 | 10/1985 | Japan | H01J 29/60 |
| 61-131349 | 6/1986 | Japan | H01J 31/38 |
| 1-298630 | 12/1989 | Japan | H01J 31/26 |
| 2-204944 | 8/1990 | Japan | H01J 29/45 |

OTHER PUBLICATIONS

An Avalanche-Mode Amorphous Selenium Photoconductive Layer for Use as a Camera Tube Target-IEEE electron device letters vol. EDL-8. No. 9, Sep. 1987.

*Primary Examiner*—Michael T. Razavi
*Assistant Examiner*—Tuan V. Ho
*Attorney, Agent, or Firm*—Antonelli, Terry, Stout & Kraus

[57] ABSTRACT

An image pickup tube is provided with the third electrode to control the potential of the region which is not scanned by an electron beam in the image pickup tube target section including a target electrode and a photoconductive film. A method for operating this image pickup tube is also disclosed. Thus, undesired image phenomena which are generated when the image pickup tube is used with a relatively high target voltage, e.g., image distortion, shading, a waterfall phenomenon and image inversion phenomenon can be suppressed, thereby realizing a high sensitivity image pickup tube.

20 Claims, 19 Drawing Sheets

IMAGE PICKUP TUBE UTILIZING THIRD ELECTRODE AND ITS OPERATING METHOD

BACKGROUND OF THE INVENTION

The present invention relates to an image pickup tube which is preferably used with a target voltage enhanced, and its operating method.

Generally, a photocondutive-type image pickup tube or an X-ray image pickup tube (hereinafter generally referred to as an image pickup tube) is provided with a target section for converting an image of incident light or an X-ray (hereinafter generally referred to as light) into a charge pattern to be stored, and a scanning electron beam generating section for reading the stored charge pattern as a signal current. Immediately after the target section is scanned by the electron beam, the image pickup tube is operated so that the surface potential on the electron beam scanning side balances with the cathode potential. Incidentally, the structure and operation theory of the image pickup tube are disclosed in detail in e.g. SATSUZO KOGAKU (or Imaging Engineering) by Ninomiya, et al published by Coronasha (1975), pp. 109 to 116.

If excess secondary electrons are emitted in such an image pickup tube when the scanning side of the target section is scanned by the electron beam, its surface potential immediately after scanned will not become the cathode potential. Thus, the image pickup tube cannot perform its normal operation. JP-A-48-102919 (laid-open on Dec. 24, 1973) discloses that in order to reduce the secondary electron-emission yield, an electron beam landing layer of porous $Sb_2S_3$ is provided on the scanning side of the target section.

Further, excess electron beams once reflected from the target section may be reflected by the electrode within the tube to be incident on the target section again; thus, a spurious signal will be produced to be superposed on a video signal. As means for restraining such an undesired phenomenon, (1) JP-A-61-131349 (laid-open on Jun. 19, 1986) discloses that an additional conductive layer is provided in the non-scanned region on the photo-conductive film surface of the target section, and (2) JP-A-63-72037 (laid-open on Apr. 1, 1988) discloses that the transparent conductive layer of the target section is divided into that in the effective scanned region and that in the non-scanned region on a substrate, and these transparent conductive layers are connected with different power supplies so that they are individually controlled by the power supplies.

Further known are techniques of providing a thick photo-conductive layer in order to improve the sensitivity of an image pickup tube or reduce the capacitive lag, and of using the avalanche multiplication phenomenon in the photo-conductive layer in order to further enhance the sensitivity of the image pickup tube. These techniques are disclosed in e.g. National Convention Report of 1982 of The Institute of Television Engineers of Japan, pp. 81 to 82 by Kawamura, et al, and IEEE ELECTRON DEVICE LETTERS EDL-8 No. 9 (1987), pages 392 to 394. These image pickup tubes must be used with an enhanced voltage (hereinafter simply called a target voltage) between a target electrode and a cathode electrode. Such a use is likely to produce a phenomenon that a distortion-in-picture-image or shading is generated on a reproduced image, or an abnormal pattern varying in a waterfall shape is generated in the peripheral portion of the reproduced image (hereinafter simply called a waterfall phenomenon), and to produce another phenomenon that the signal level of the video signal corresponding to a part of the reproduced image, particularly its peripheral portion is drastically reduced or the polarity of the video signal is inverted (hereinafter simply called an inversion phenomenon). As means for restraining these undesired phenomena, (3) JP-A-1-298630 (laid-open on Dec. 1, 1989) discloses that the secondary electron emission yield in the non-scanned region on the scanning side of the target section is made lower than that within the effective scanned region, and (4) JP-A-2-204944 (laid-open on Aug. 14, 1990) discloses that an insulating thin film is provided outside the effective scanned region of the target section.

The image pickup tube fabricated using the above prior arts (3) and (4) can restrain the undesired phenomenon such as the above waterfall phenomenon and inversion phenomenon in a region up to a relatively high target voltage. However, if the image pickup tube is used with a higher target voltage in order to enhance its sensitivity, the undesired phenomenon such as the above waterfall phenomenon and inversion phenomenon will occur again.

The image pickup tube fabricated using the above prior art (1) is so designed that the conductive layer provided in the non-scanned region on the photo-conductive film side of the target section is kept in contact with the target electrode through the photo-conductive film. The resistance of the photo-conductive film will be decreased by incident light. Therefore, the enhanced target voltage causes charging between the target electrode and the additional conductive layer so that the photo-conductive layer may be injured. As a result, the target voltage cannot be enhanced sufficiently.

Further, the image pickup tube fabricated using the prior art (2) is so designed that the transparent conductive layer of the target section is divided into that in the effective scanned region and that in the non-scanned region on a substrate by the photo-conductive film. Therefore, the image pickup tube according to the prior art (2) provides the same problem as that according to the prior art (1); the target voltage cannot be enhanced sufficiently. Further, the process of fabricating the target section is complicate, and so during the fabricating process, dust is likely to be applied to the target and minute defects is likely to occur there. This will provide local image defects, thereby reducing the production yield. Accordingly, the highly sensitive image pickup tube cannot be provided so that a highly image pickup device and a highly sensitive camera cannot be realized.

SUMMARY OF THE INVENTION

A main object of the present invention is to provide a highly sensitive image pickup tube which is free from undesired phenomen such as a 'waterfall phenomenon' and an 'inversion phenomenon', and a method for operating it.

Another object of the present invention is to provide an image pickup tube which can provide, in a stabilized and simple manner, improved image quality immune to undesired phenomena such as the waterfall phenomenon and the inversion phenomenon under a voltage so high as to cause an avalanche multiplication phenomenon within the photo-conductive film in the target section.

Still another object of the present invention is to provide an image pickup device free from undesired phenomena such as the waterfall phenomenon and the inversion phenomenon.

A further object of the present invention is to provide a highly sensitive camera free from undesired phenomena such as the waterfall phenomenon and the inversion phenomenon.

These objects of the present invention can be attained by an image pickup tube comprising, in addition to an image pickup tube target section including at least a photo-conductive film and a target electrode, a mesh electrode opposed to the target section, and scanning beam emitting means including a cathode electrode for emitting electrons and means for scanning the electron beam, said cathode electrode being opposed to the mesh electrode and located on the opposite side of the target section with respect to the mesh electrode, electrode means, insulated from the target electrode, for controlling the surface potential of the non-scanned region of the target section while the image pickup tube operates.

The above objects can be also attained by operating the image pickup tube under the state where the surface potential of the non-scanned region is substantially controlled to the cathode potential by the electrode means.

The above objects can also be attained by operating the image pickup tube under the state where the voltage at the electrode means is set for the voltage lower than that at the target electrode.

The above objects can be more efficiently attained by variably controlling the voltage at the electrode means in synchronism with scanning electron beams.

The above objects can also be attained by a camera provided with the image pickup tube having the above electrode means.

These and other objects and many of the attendant advantages of the present invention will be readily appreciated as the same becomes better understood by reference to the following detailed description when considered in connection with the accompanying drawings.

DESCRIPTION OF THE PREFERRED EMBODIMENTS

Figure 1A:
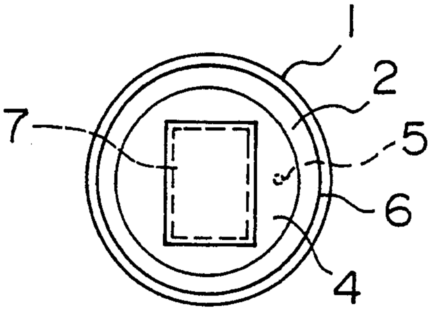
FIGS. 1A and 6A are plan views of image pickup tubes according to the present invention.

The inventors of the present invention investigated the above image distortion, shading, waterfall phenomenon and inversion phenomenon. As a result, it was found out that these undesired phenomena are due to the following causes.

Generally, the photo-conductive image pickup tube is used with its mesh electrode applied with 200 to 2000 volts and its target electrode applied with several volts to several hundreds of volts in terms of its cathode electrode. When the image pickup tube is operated with such voltages, the region of the target surface to be scanned by an electron beam (hereinafter referred to as 'effective scanned region') is scanned by the electron beam for each field (i.e. scanning the entire effective scanned region) so that electrons are applied to the effective scanned region. Therefore, immediately thereafter, the surface potential of the effective region will substantially balance with the cathode potential, and excess electrons during the scanning will return to the cathode side. The excess electrons are referred to as returning electron beams. On the other hand, when light is projected through the target, a light current is generated in the photo-conductive layer. This makes higher the surface potential of the effective scanned region than the cathode potential by the voltage change which depends on the amount of light projected during the field period (time required to scan once the entire effective scanned region) and the electrostatic capacitance of the photo-conductive layer. This voltage increase, however, is at most several volts to ten-and-several volts or so in the normal operation so that the surface potential of the effective scanned region will return to the cathode potential again by the subsequent scanning by electron beams.

On the other hand, the portion except the effective scanned region (hereinafter referred to as 'non-scanned region') on the photo-conductive region is not directly scanned by electron beams during the operation of the image pickup tube. Therefore, the surface potential of this region will not be fixed to a certain value but rather become higher than the cathode potential. The reason is as follows. If a potential difference is generated across the photo-conductive layer at the non-scanned region, a dark current or photo-current (which is due to stray light or incident in-tube scattered light) will flow. This current serves to remove the potential difference. Thus, the surface potential at the non-scanned region of the photo-conductive layer will rather balance with the potential at the target electrode than that at the cathode electrode.

However, the surface potential at the non-scanned region thus enhanced will influence the secondary electrons generated within the tube, the above returning electrons, or the electrons straying in the tube (e.g. scattered electrons generated when the secondary electrons or returning electrons are reflected from the electrode walls). Thus, the straying electrons will be actively applied to the non-scanned region surface. This serves to reduce the surface potential at the non-scanned region.

Accordingly, during the operation of the image pickup tube, the above two actions mainly occur simultaneously. Therefore, the surface potential at the non-scanned region will vary in accordance with the amount of incident light, the amount of scanning beams, the voltages at the respective electrodes, etc. As a result, a potential difference between the effective scanned region and the non-scanned region will be generated on the electron beam scanning side; this potential difference will vary in a complicated manner at different positions and times.

Accordingly, the electron beams which are to scan the portion near the boundary of the effective scanned region will be greatly influenced by the complicated surface potential difference inside and outside the effective scanned region. This will bend the locus of the scanning electron beams. Thus, the electron beams cannot be incident perpendicularly on the target. As a result, the picture image distortion and shading will occur in the neighborhood of the boundary of the effective scanned region. Further, the boosted target voltage will boost the surface potential at the non-scanned region so that the energy of the straying electrons rushing into the non-scanned region will be increased. As a result, secondary electrons will be actively emitted, thus causing the waterfall phenomenon. If the secondary electrons are so actively emitted that its emission rate exceeds 1, the surface potential at the non-scanned region will exceed the potential at the target potential to acceleratedly increase. It will eventually approach the potential at the mesh electrode which is higher than that at the target electrode. In such a circumstance, the high potential region in the non-scanned region will finally invade the effective scanned region, thus causing the inversion phenomenon.

As described above, undesired phenomena relative to a reproduced image such as the image distortion, shading, waterfall phenomenon, and inversion phenomenon which occur in the periphery of the monitored image are due to the fact that the surface potential at the non-scanned region varies during the operation and the potential variation thus generated influence the scanning electron beams or straying electrons.

Accordingly, the inventors of the present invention found out that the undesired phenomena relative to the reproduced image can be prevented by controlling the surface potential at the non-scanned region.

The present invention is provided with electrode means for controlling the surface potential at the non-scanned region of an image pickup target; this electrode means is arranged through the target electrode and the insulating layer of vacuum or an insulating film. This electrode means serves to control the surface potential at the non-scanned region so that the undesired phenomena such as the image distortion, shading, waterfall phenomenon, and inversion phenomenon. Further, the insulating layer of vacuum or an insulating film is provided between the target electrode and the electrode means so that even if a high voltage is applied to the target, the photo-electric layer will not be broken.

The third electrode can be used as the above electrode means. This third electrode is arranged between the target and the mesh electrode, insulated from them by vacuum or the insulating film and arranged over the non-scanned region of the target.

The third electrode serving as the above electrode means may be provided on the insulating layer opposite to the target electrode with respect to the photo-conductive layer and over the non-scanned region of the target.

Now referring to the drawings, the construction and operation of the present invention will be explained in connection with several embodiments.

Figure 1B:
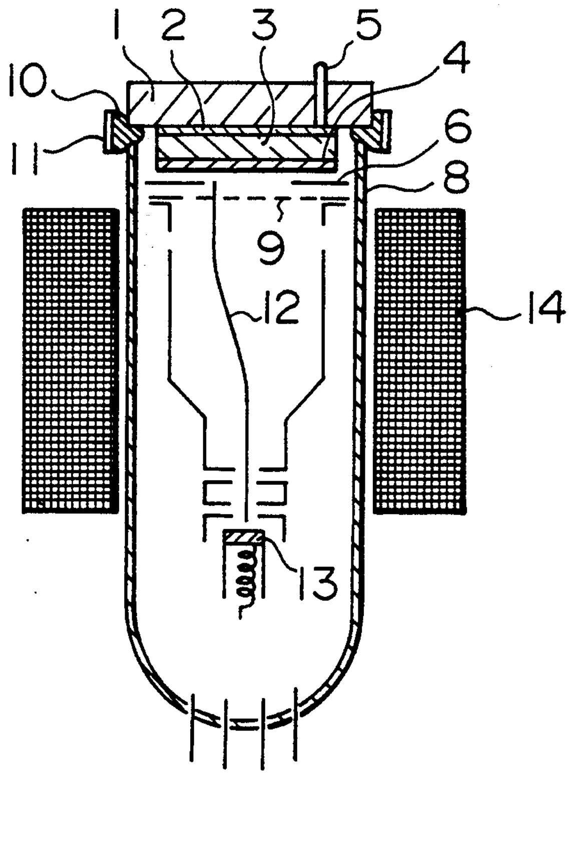
FIGS. 1B and 6B are sectional views of image pickup tubes accoridng to the present invention.

FIGS. 1A and 1B show one embodiment of the basic arrangement of the image pickup tube according to the present invention. FIG. 1A is a plan view of the image pickup tube viewed from the side of scanning an electron beam, and FIG. 1B is a schematic sectional view of the main part of the image pickup tube according to the present invention. In FIGS. 1A and 1B, 1 denotes a substrate mainly made of silicon oxide or aluminum oxide; 2 a target electrode; 3 is a photo-conductive film; 4 a surface layer on the electron beam scanning side; 5 a signal electrode pin connected with the target electrode 1; 6 the third electrode according to the present invention; 7 (broken line) the boundary line of an effective scanned region, the inside of which is scanned by electron beams; 8 a bulb of the image pickup tube; 9 a mesh electrode; 10 an indium ring for vacuum-sealing the substrate 1 onto the bulb 8; 11 a metal ring; 12 a scanning electron beam; 13 a cathode for emitting the scanning electron beam; and 14 a coil for deflecting and focusing the emitted electron beam.

The image pickup tube according to the present invention is different from the conventional image pickup tube in that as shown in FIGS. 1A and 1B, the third electrode 6 is arranged between the photo-conductive film 3 and the mesh electrode 9 in such a manner that it is insulated from the target electrode 2 and photo-conductive film 3 and from the mesh electrode 9. In the image pickup tube according to the present invention, the third electrode 6 is located in the neighborhood of the non-scanned region of the image pickup tube target so that stray electrons such as secondary electrons and scattered electrons produced within the image pickup tube during its operation do not fall on the non-scanned region, thus preventing the surface potential at the non-scanned region from varying. Further, if the third electrode 6 is used under the condition that it is applied with the voltage lower than a target voltage, preferably the same potential as that at the cathode electrode 13, the drastic potential variation produced in the periphery of the effective scanned region as described disappears. Therefore, the scanning electron beam bending toward the higher potential is suppressed, thus restraining generation of the secondary electrons. In this way, the third electrode 6 serves to prevent the undesired image phenomena such as the shading, waterfall phenomenon, and inversion phenomenon.

If the distance Lg between the third electrode 6 and the photo-conductive film 3 is too long, the image distortion is liable to be generated, whereas if it is too short, the electro-static capacitance between the target electrode 2 and the third electrode 6 becomes large to injure the image quality. Therefore, the distance Lg is desired to range from 5 $\mu$m to 2 mm, preferably from 10 $\mu$m to 1 mm.

The third electrode 6 is not limited to a circular electrode having a square opening window at its center which is slightly larger than the effective scanned region as shown in FIG. 1A, but may take several shapes.

Figure 2A:
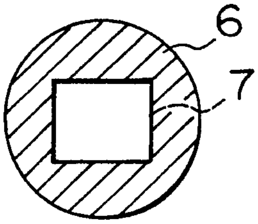
FIGS. 2A to 2J and FIGS. 8A to 8J are plan views of the third electrodes used in the image pickup tube according to the present invention.
Figure 2B:
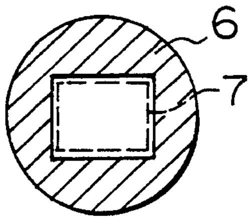
Figure 2C:
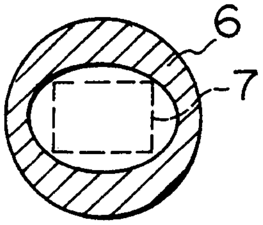
Figure 2D:
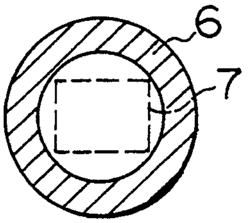
Figure 2E:
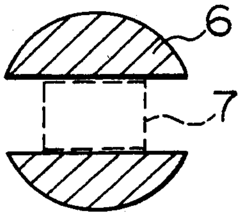
Figure 2F:
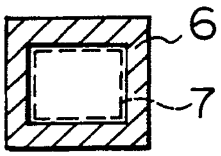
Figure 2G:
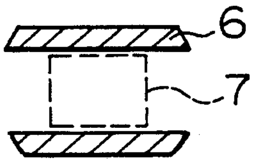
Figure 2H:
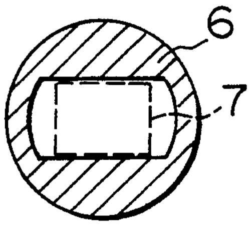
Figure 2I:
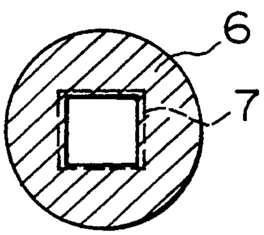
Figure 2J:
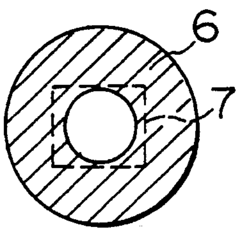

FIGS. 2A to 2J show several shapes of the third electrode 6. As seen from these figures, the shape of the opening window of the third electrode 6 may be a square, a circle or an ellipse instead of a square. It is important that the third electrode 6 has such a shape as covers at least a portion of the non-scanned region other than the effective scanned region 7 of the image pickup tube. The third electrode 6 which covers the entire non-scanned region 6 can provide the most significant effect. FIGS. 2A to 2H show the case where the opening portion of the third electrode 6 has a larger area than the effective scanned region 7, and FIGS. 2I and 2J show the case where the former has a smaller area than the latter. The shapes as shown in FIGS. 2I and 2J can be preferably used to pick up the output image from, particularly, an optical microscope or an X-ray image intensifier.

In order to operate the third electrode 6 in a state applied with the voltage different from that which is applied to the target electrode 2 and the mesh electrode 9, it must be insulated from the target electrode 2 and the mesh electrode 9.

Figure 3A:
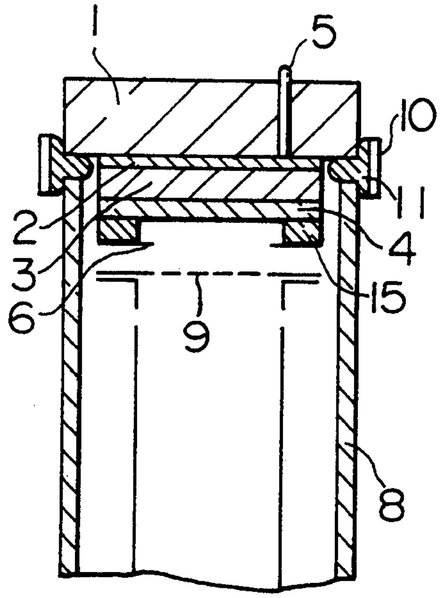
FIGS. 3A and 3B and FIGS. 4A and 4B are partial sectional views of the image pickup tubes each provided with the third electrode according to the present invention.
Figure 3B:
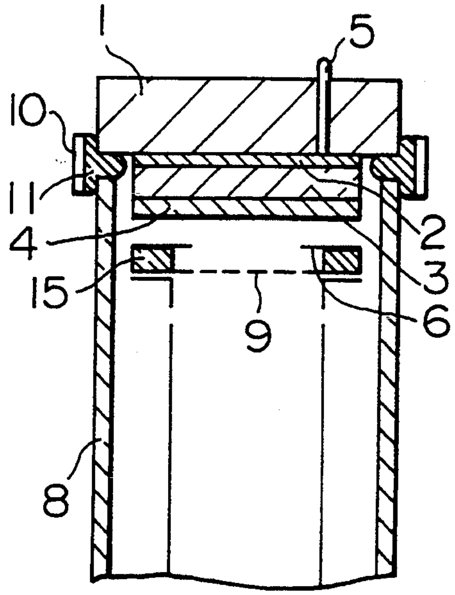

In order to insulate the third electrode 6 from the target electrode 2 and the mesh electrode 9, in FIG. 1B, the third electrode 6 is arranged in the gap formed between the mesh electrode 9 and the image pickup tube target section. Besides, as seen from FIG. 3A, the third electrode 6 may be arranged on the image pickup tube target through an insulating layer 15, and as seen from FIG. 3B, the third electrode 6 may be arranged on the mesh electrode 9 through the insulating layer 15. In this case, if the area of the opening window of the third electrode 6 is equal to or larger than that of the insulating layer 15, straying electrons in the image pickup tube rush into the inner wall of the insulating layer 15 so that they become liable to be charged. As a result, discharging will occur in the inner wall of the insulating layer 15 between the photo-conductive film 3 and the third electrode 6 (FIG. 3A), or between the mesh electrode 9 and the third electrode 6 (FIG. 3B). This discharging can be restrained by making the opening window of the third electrode 6 smaller than that of the insulating layer 15 as shown in FIGS. 3A and 3B. The restraining effect is more considerable as the opening window of the third electrode 6 has a smaller area.

In one example of the fabrication process, an insulating layer of $SiO_2$ having a thickness of 30 $\mu m$ is formed on the image pickup tube target by vacuum evaporation, and thereafter the third electrode (made of SUS 403 and 0.05 mm thick) having an opening window, of which the diameter is smaller than that of the insulating layer by 2 mm, is bonded to the insulating layer by bonding agent. Thus, the image pickup tube provided with the third electrode as shown in FIG. 3A can be provided.

The insulating layer 15 is desired to have a resistance larger than that of the photo-conductive film 3. This insulating layer 15 may be a thin plate or evaporated thin film of a single layer or a composite layer formed by stacking two or more single layers, and the single layer may be, for example, made of at least one selected from the group consisting of an oxide specified below, a fluoride specified below, a nitride specified below, silicon carbide, zinc sulfide, a polyimide polymer, an epoxy polymer. The above-mentioned oxide may be an oxide of at least one selected from the group consisting of Mg, Al, Si, Ti, Mn, Zn, Ge, Y, Nb, Sb, Ta and Bi or a mixture of oxides of two or more of these elements. The above-mentioned fluoride may be a fluoride of at least one selected from the group consisting of Li, Na, Mg, Al, K, Ca, Ge, Sr, Ln and Ba or a mixture of fluorides of two or more of these elements. The above-mentioned nitride may be a nitride of at least one selected from the group consisting of B, Al and Si or a mixture of nitrides of two or more of these elements.

Figure 4A:
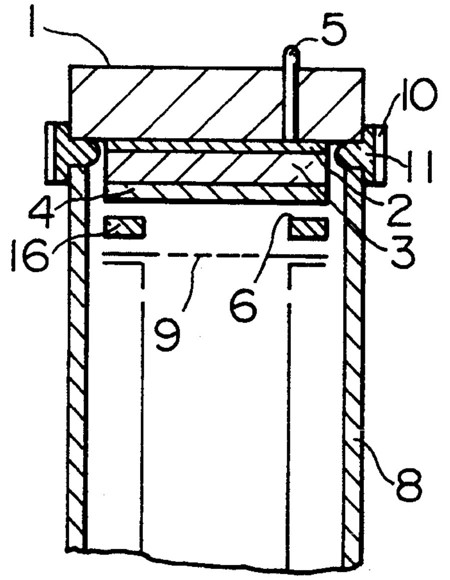
Figure 4B:
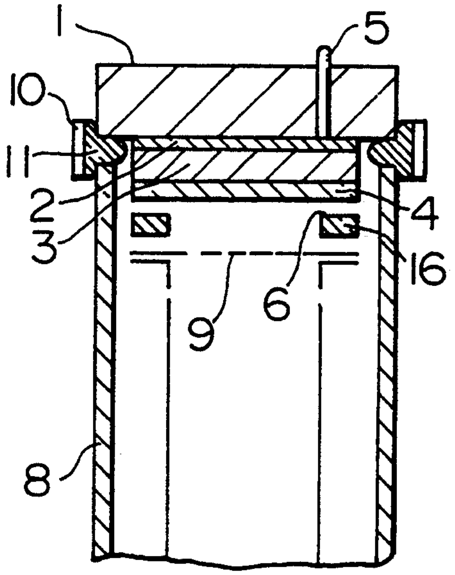

Further, as shown in FIGS. 4A and 4B, a thin plate may be bonded or a conductive film may be deposited as the third electrode 6 onto at least one side of the insulating thin plate mainly made of silicon oxide or aluminum oxide serving as a supporting plate. Only one thing required is that the third electrode 6 insulated from the image pickup tube target and the mesh electrode 9 is arranged between them.

It is preferable that at least the surface of the third electrode 6 opposite to the mesh electrode 9 is difficult to occur emission of secondary electrons due to rushing of straying electrons in the tube. This can be attained by making the surface of the third electrode 6 coarse or depositing a porous film of e.g. $Sb_2S_3$, $As_2Se_3$ or CdTe on the surface thereof.

Figure 5A:
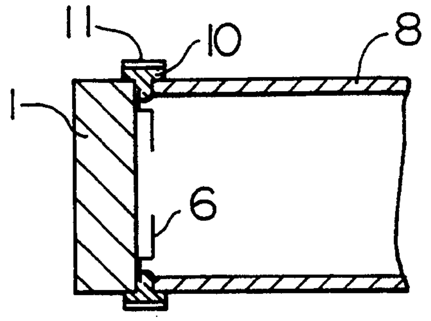
FIGS. 5A to 5D and FIGS. 7A to 7C are partial sectional views of the image pickup tubes according to the present invention for explaining the manner of drawing out the third electrode.
Figure 5B:
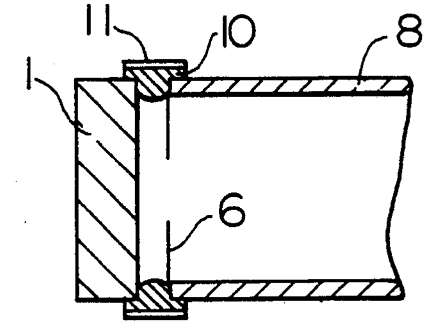
Figure 5C:
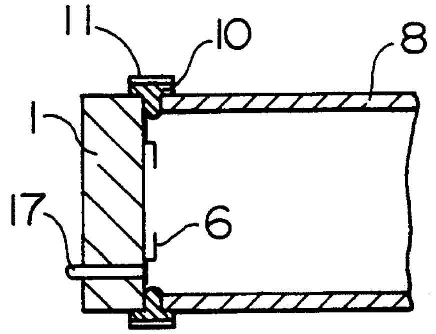
Figure 5D:
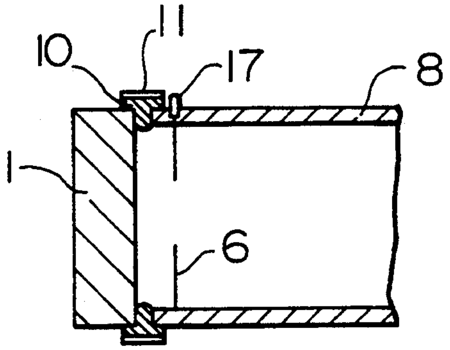

FIGS. 5A to 5D show several manners in which the third electrode 6 is actually located (the target electrode 2, signal electrode pin 5 and photo-conductive film 3 are not shown for simplicity of brevity). In FIGS. 5C and 5D, 17 denotes a pin for extracting the third electrode 6; this pin is connected with the third electrode 6 in the tube. In FIGS. 5A and 5B, the third electrode 6 is connected with indium; in FIG. 5C, the pin 17 penetrating through the substrate 1 is connected with the third electrode 6 within the image pickup tube; and in FIG. 5D, the pin 17 penetrating through the outer tube of the image pickup tube is connected with the third electrode 6 within the image pickup tube.

Figure 6A:
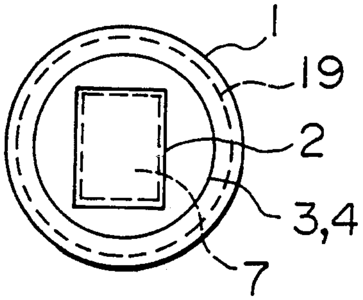
Figure 6B:
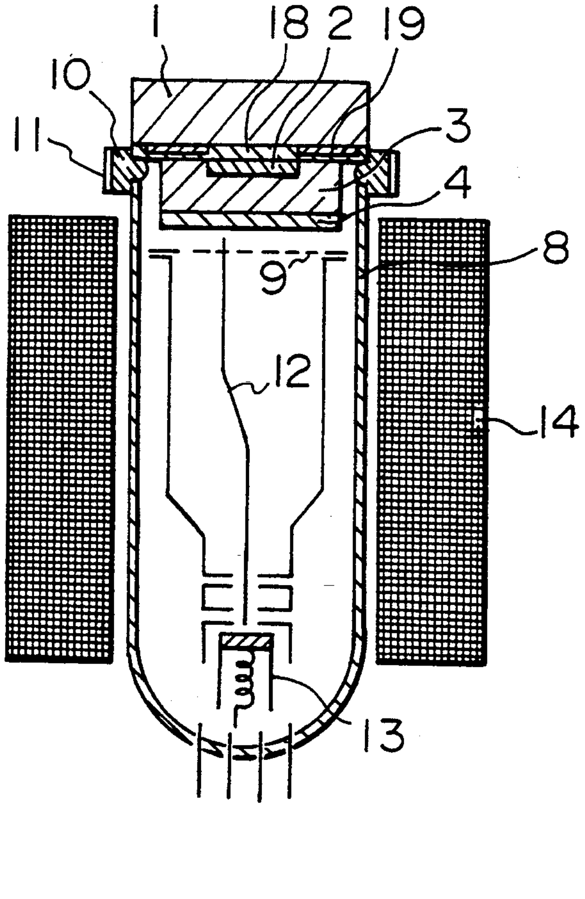

FIGS. 6A and 6B show another embodiment of the basic arrangement of the image pickup tube according to the present invention. FIG. 6A is a plan view of the image pickup tube target viewed from the electron beam scanning side, and FIG. 6B is a schematic sectional view of the main portion of the image pickup tube. In FIGS. 6A and 6B, 1 denotes a transparent insulating substrate; 18 a transparent insulating thin film; and 19 the third electrode having an opening for passing signal light. Other reference numerals denote like elements in FIGS. 1A and 1B. Additionally, the insulating substrate 1, if the target has a sufficient mechanical strength, may be removed. The target electrode 2 is desired to have the same shape as the opening of the third electrode 19 in order to minimize overlapping of the target electrode 2 with the third electrode 19.

The image pickup tube in this embodiment is basically different from the conventional image pickup tube in that as seen from FIGS. 6B, the third electrode 19 is located at the position opposite to the target electrode 2 through the insulating thin film 18 in such a manner that it is insulated from the target electrode 2, the photo-conductive thin film 3 and the mesh electrode 9. It should be noted that with the third electrode 19 set for the same potential as that at the cathode electrode, the straying electrons in the tube cannot deposit on the non-scanned region. As a result, the surface potential of the non-scanned region is always held at the cathode potential so that occurrence of the undesired phenomena such as the above image distortion, shading, waterfall phenomenon and inversion phenomenon can be restrained.

Figure 7A:
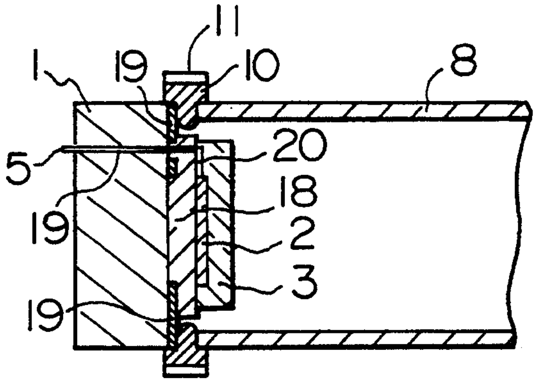
Figure 7B:
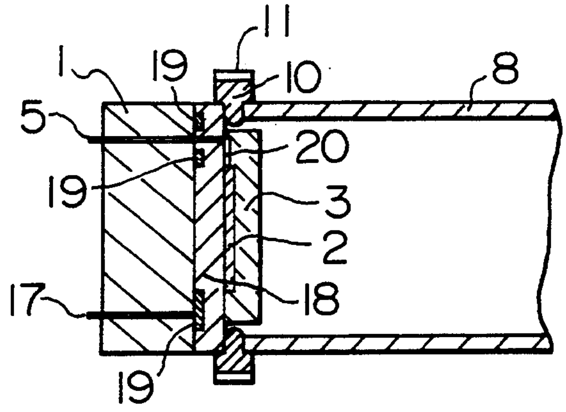
Figure 7C:
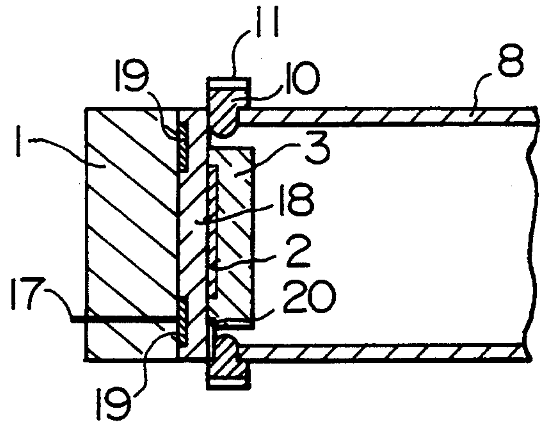

FIGS. 7A to 7C are schematic sectional views showing the actual manners of applying a voltage to the target electrode 2 and third electrode 19 in the image pickup tube shown in FIG. 6B. In these figures, 5 denotes a signal electrode pin penetrating through the insulating substrate 1 and the insulating thin film 18; 17 a third electrode extracting pin penetrating through the insulating substrate 1; and 20 a lead section for electrically connecting the target electrode 2 with the signal electrode pin 5 or the indium ring 10. In FIG. 7A, the third electrode is kept in electrical contact with indium ring 10; in FIG. 7B, both third electrode 19 and target electrode 2 are connected with individual electrode pins 17 and 5, respectively; and in FIG. 7C, the target electrode 2 is connected with the indium electrode 10. Although the design shown in FIG. 7C is the simplest, the effect intended by the present invention is the most remarkable in the constructions shown in FIGS. 7A and 7B; particularly, the structure of FIG. 7B has an advantage that the indium ring 10 can be brought into contact with the mesh electrode (not shown).

The insulating substrate 1 is provided in all of FIGS. 7A to 7C. But, if the insulating thin film 18 has a sufficient mechanical strength, the insulating substrate 1 can be partially (e.g. in the portion corresponding to the effective scanned region) or entirely removed.

This insulating thin film 18 may be a thin plate or evaporated thin film of a single layer or a composite layer formed by stacking two or more single layers, and the single layer may be, for example, made of at least one selected from the group consisting of an oxide specified below, a fluoride specified below, a nitride specified below, silicon carbide, zinc sulfide, a polyimide polymer, an epoxy polymer. The above-mentioned oxide may be an oxide of at least one selected from the group consisting of Mg, Al, Si, Ti, Mn, Zn, Ge, Y, Nb, Sb, Ta and Bi or a mixture of oxides of two or more of these elements. The above-mentioned fluoride may be a fluoride of at least one selected from the group consisting of Li, Na, Mg, Al, K, Ca, Ge, Sr, Ln and Ba or a mixture of fluorides of two or more of these elements. The above-mentioned nitride may be a nitride of at least one selected from the group consisting of B, Al and Si or a mixture of nitrides of two or more of these elements. The effect of the present invention is more remarkable as the insulating film is thinner. But if the insulating film is too thin, discharging may occur between the target electrode 2 and the third electrode 19. The thickness of the insulating thin film 18 should be determined considering the operating condition such as the target voltage.

The use of a metallic plate or film as the third electrode 19, which permits the light incident from the portion corresponding to the non-scanned region to be shaded, is very preferable. However, the object of the present invention can be also attained using, as the third electrode, the oxide conductor mainly made of indium oxide or tin oxide.

The insulating thin film serves to not only electrically insulate the target electrode 2 and the third electrode 19 from each other but also block the dark current or photo-current in the non-scanned region.

Further, the third electrode 19, if it is made of the non-transparent material such as metal, can shade the light externally incident to the non-scanned region.

The third electrode 19 is not necessarily required to be located on the entire region corresponding to the non-scanned region as shown in FIG. 6A, but may be partially removed as necessity requires. Limiting the opening of the third electrode 19 to the portion corresponding to the effective scanned region provides the most remarkable effect of the present invention, but changing the shape of the opening as necessity requires can also provide the corresponding effect.

FIGS. 8A to 8J are sectional views showing several shapes of the third electrode. The effect of the present invention is the most remarkable in the cases where the third electrode 19 as shown in FIGS. 8A, 8B, 8F, 8I and 8J is used. Particularly, the third electrode 19 is suitable to pick up, e.g. the output image from an image intensifier or an optical microscope.

Explanation has been given of the cases where the third electrode 6 is located between the image pickup tube target and the mesh electrode 9 as shown in FIG. 1B, and where the third electrode 19 is located on the side opposite to the target electrode with respect to the insulating thin film as shown in FIG. 6B. However, location of the third electrode should not be limited to the cases explained, but may be realized by combining these cases. In this case, the effect of restraining the undesired phenomena described above becomes more remarkable.

In the image pickup tubes according to the present invention hitherto explained, the photo-conductive film is not required to be formed on substantially the entire area of the substrate surface, but has only to be within the range covering at least the effective scanned region for an electron beam.

Also, the target electrode has only to be within the range covering at least the effective scanned region for an electron beam. The smaller the area of the target electrode, the smaller the electrostatic capacitance, so that a high quality image with large S/N can be obtained.

Further, in the image pickup tube according to the present invention, a porous thin film for restricting the secondary electron emission yield may be formed on the surface of the image pickup tube target outside the effective scanned region. In this case, the effect of the present invention can be realized more effectively and stably.

Additionally, the electron beam generating section in the image pickup tube according to the present invention should not be limited to the electromagnetic deflection and electromagnetic focusing type, but may be realized in the electromagnetic deflection and electrostatic focusing type, the electrostatic deflection and electromagnetic focusing type or the electrostatic deflection and electrostatic focusing type (these types are well known).

The basic arrangement of the present invention and its operation have been hitherto explained. In the operation, the potential at the third electrode should not be limited to the cathode potential; using the third electrode applied with a potential lower than the target potential provides the corresponding effect.

Introduction of the third electrode may disturb the balanced electric field distribution between the image pickup tube and the mesh electrode beyond a permissible limit so that some image distortion may occur in the periphery of the image. In order to obviate this, in the image pickup tube as shown in FIG. 1B in which the third electrode is located between the image pickup tube target and the mesh electrode, the voltage at the third electrode is desired to satisfy the following conditions:

$$Vk \leqq Vg \leqq Vm \cdot (Lg/Lm), \text{ and}$$

$$Vg < Vt$$

where Vg is a third electrode voltage; Vk denotes a cathode electrode voltage; Vm is a potential difference between the mesh electrode and the cathode electrode; Vt a potential difference between the target electrode and the cathode electrode; Lg the distance between the photo-conductive film and the third electrode; and Lm the distance between the photo-conductive film and the mesh electrode.

On the other hand, in the image pickup tube as shown in FIG. 6B in which the third electrode is provided on that surface of the insulating layer which is opposite to the surface of the insulating layer on which the target electrode is provided, the voltage Vg at the third electrode is desired to satisfy the following conditions:

$$-Vt \leqq Vg \leqq Vk$$

Further, the image pickup tube according to the present invention may produce disorder in the spatial electric field between the image pickup tube target and the mesh electrode owing to several causes including accuracies of machining and attaching the third electrode, i.e. variations in the parallelism between the third electrode and the photo-conductive film, and between the third electrode and the mesh electrode, discrepancy between the effective scanned region of the image pickup tube target and the opening of the third electrode, distortion or twist of the third electrode, etc. This may generate uneven image distortion on the image. Such a phenomenon can be restrained by variably controlling the voltage to be applied to the third electrode within the above range in synchronism with scanning an electron beam.

Figure 9:
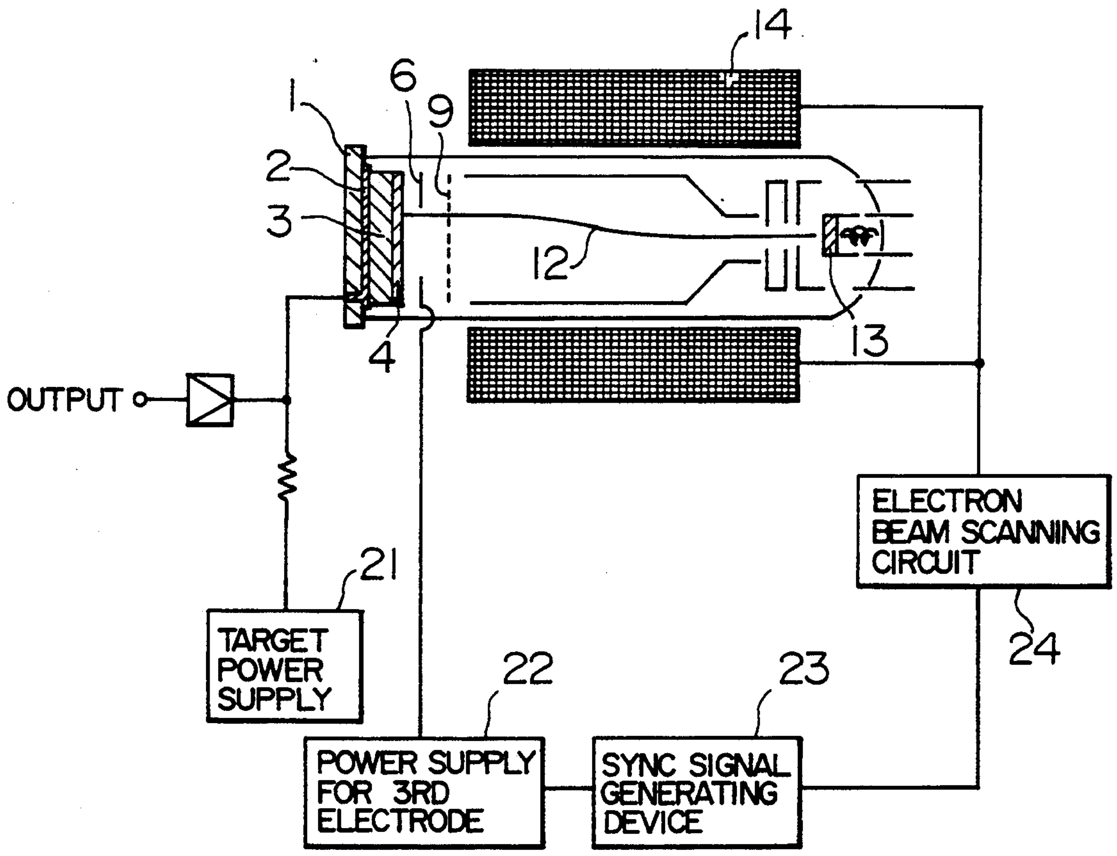
FIG. 9 is a schematic view of the image pickup equipment according to the present invention for explaining its arrangement and its operating method.

FIG. 9 is a schematic sectional view for explaining the arrangement of an image pickup tube provided with the image pickup tube according to the present invention and its operation. In FIG. 9, 21 denotes a target power supply; 22 a power supply for the third electrode for generating a variable control voltage in synchronism with scanning an electron beam; 23 a synchronization signal generating device; and 24 an electron beam scanning circuit. In the image pickup tube according to the present invention, the image distortion varies in accordance with the voltage applied to the third electrode 6. Therefore, if the voltage to be applied to the third electrode 6 by the power supply 22 is continuously varied in synchronism with scanning an electron beam, the image distortion at individual positions on the image can be minimized.

Incidentally, although in the image pickup tube shown in FIG. 9, the third electrode is located between the photo-conductive film 3 and the mesh electrode 9, the image distortion can be removed in the same manner in also the image pickup tube having a different structure according to the present invention.

The present invention can be applied to the image pickup tube having any optional photo-conductive film. Particularly, if the present invention is applied to the image pickup tube in a blocking-type structure having the photo-condutive film at least a part of which is made of amorphous semiconductor mainly containing Se or Si, a very excellent image with high sensitivity, high resolution, and low lag can be obtained suppressing the undesired image phenomena as described previously.

Further, if the present invention is applied to a charge multiplication type image pickup tube in which the target voltage is so high as to cause avalanche multiplication of charges within the photo-conductive film, high sensitivity exceeding quantum efficiency of 1 can be realized suppressing the undesired image phenomena such as the image distortion, shading, waterfall phenomenon and inversion phenomenon during the operation.

Although the present invention has been explained on the photo-conductive type image pickup tube, it can be applied to an X-ray image pickup tube, if a thin plate of material having a high permeability for X-rays such as Be, BN and Ti is used as the substrate, and/or if BN is used as the insulating thin plate. Generally, in order to increase the absorbance amount of incident X-rays, the X-ray image pickup tube is operated with a target voltage boosted by increasing the thickness of the X-ray conductive film (hereinafter generally referred to as a "photo-conductive film" including the X-ray conductive film) so that the undesired image phenomena are likely to occur. The present invention can greatly suppress them.

As understood from the explanation hitherto made, the image pickup tube provided with the third electrode according to the present invention has a simple structure and is not burdened with any limitation of the photo-conductive film so that it can be fabricated with a high production yield by the conventional method, and also the image pickup tube thus fabricated has a good performance. In this point, the present invention can provide a great industrial effect.

Hereinafter, several actual embodiments of the present invention will be explained.

Embodiment 1

Figure 10A:
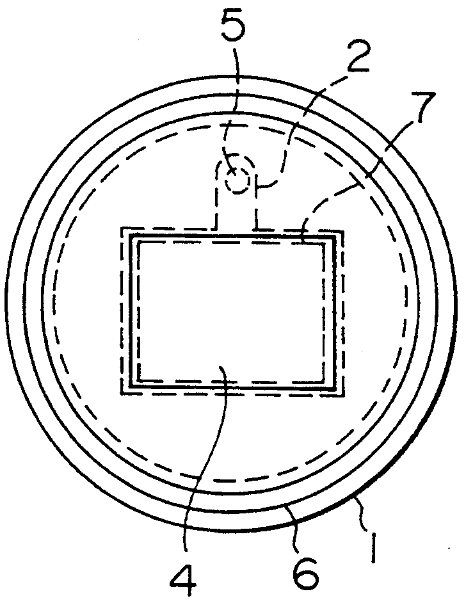
FIGS. 10A, 11A, 12A, 13A, 14A, 15A, 16A, 17A, 18A, 19A, 20A, 21A, 22A, 23A and 24A are plan views of image pickup tubes according to the present invention.
Figure 10B:
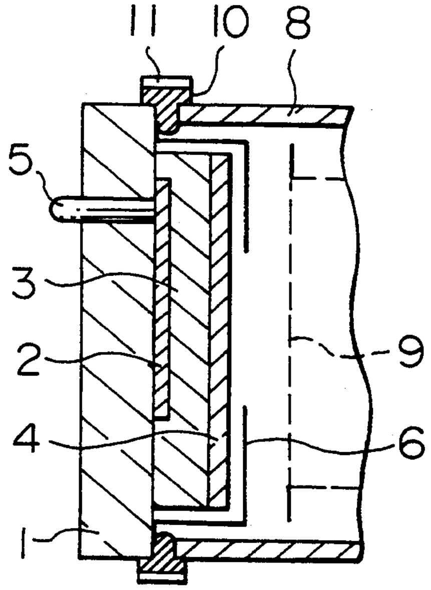
FIGS. 10B, 11B, 12B, 13B, 14B, 15B, 16B, 17B, 18B, 19B, 20B, 21B, 22B, 23B and 24B are partially cross-sectional views of image pickup tubes according to the present invention.

Referring to FIGS. 10A and 10B, Embodiment 1 of the present invention will be explained.

This embodiment combines the third electrode 6 having a shape as shown in FIG. 2B with the manner of extracting the third electrode as shown in FIG. 5A. FIG. 10A is a plan view of the image pickup tube target and the third electrode 6 viewed from the electron beam scanning side, and FIG. 10B is a schematic sectional view of the main part of the image pickup tube.

The image pickup tube is fabricated as follows. First, a bore is made in a transparent glass substrate 1 having a size of about 1 inch $\phi$ and a signal electrode pin 5 is fused into the bore. A transparent conductive film is formed on one side of the glass substrate as a target electrode 2 by activated evaporation in an oxygen gas atmosphere; the transparent conductive film is mainly made of $In_2O_3$ and has an area of 10.4 mm $\times$16.4 mm and a thickness of 20 nm. A blocking layer (not shown) for preventing hole injection which is made of $CeO_2$ and has a diameter of 20 mm and a thickness of 10–30 nm is formed on the target electrode 2 by vacuum evaporation. A photo-conductive film 3 of amorphous semiconductor mainly containing Se and having a diameter of 20 mm$\phi$ and a thickness of 1–30 $\mu$m is formed on the blocking layer by vacuum evaporation. $Sb_2S_3$ is evaporated on the photo-conductive film 3 in an atmosphere of Ar gas under the pressure of 0.1–0.4 Torr thereby to form a porous surface layer 4 having a diameter of 20 mm and a thickness of 0.1 $\mu$m. Thus, the image pickup tube target is completed.

The image pickup tube target thus completed and the third electrode 6 made of SUS 304 (which has a thickness of 0.1 mm, an opening window of 9.0 mm ×15.0 mm, an outer diameter of 23 mm and a gap from the porous surface layer 4 of 30 μm) are sealed within the bulb 8 by an indium ring 10 and the inside of the bulb 8 is vacuum-sealed. Thus, the image pickup tube provided with the third electrode is completed.

In the image pickup tube accoridng to this embodiment, the third electrode 6 is fixed by the glass substrate 1 and the indium ring 10 so that the distance between the image pickup tube target and the third electrode 6 is maintained constant.

Embodiment 2

Figure 11A:
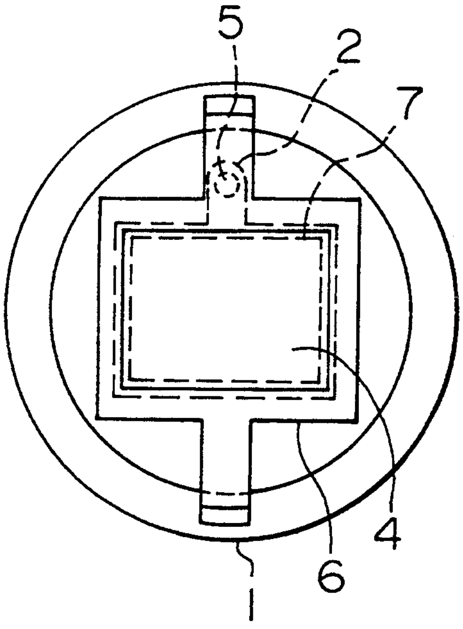
Figure 11B:
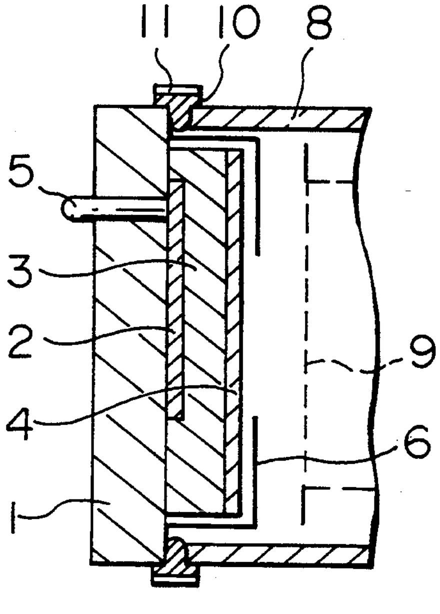

Referring to FIGS. 11A and 11B, the second embodiment of the present invention will be explained.

This embodiment combines the third electrode 6 having a shape as shown in FIG. 2F with the manner of extracting the third electrode as shown in FIG. 5A. FIG. 11A is a plan view of the image pickup tube target and the third electrode 6 viewed from the electron beam scanning side, and FIG. 11B is a schematic sectional view of the main part of the image pickup tube.

The image pickup tube target prepared in the same manner as in Embodiment 1 and the third electrode 6 made of aluminum (which has a thickness of 0.2 mm, an opening window of 9.0 mm ×15.0 mm, an outer peripheral diameter of 23 mmϕ and a gap from the porous surface layer 4 of 0.1 mm) are sealed within the bulb 8 by an indium ring 10 and the inside of the case is vacuum-sealed. Thus, the image pickup tube provided with the third electrode is prepared.

The image pickup tube according to this embodiment has a smaller contact area of the third electrode 6 and the indium ring 10 than in the first embodiment so that it has very high reliability to vacuum.

Embodiment 3

Figure 12A:
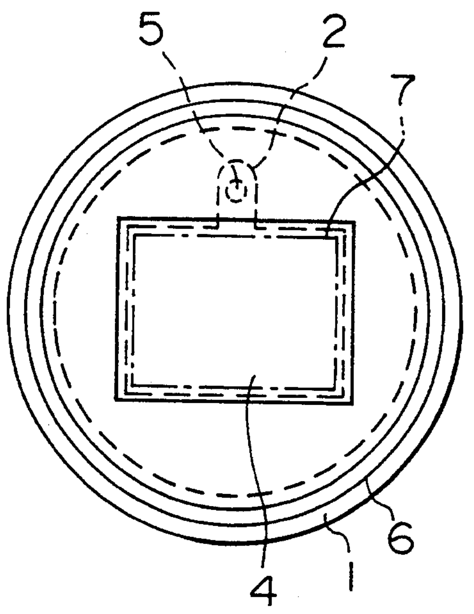
Figure 12B:
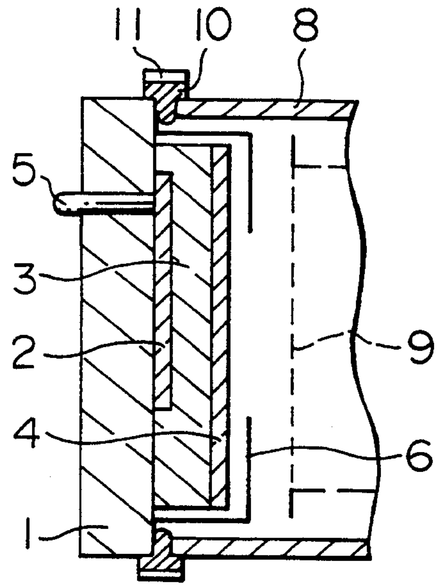

Referring to FIGS. 12A and 12B, the third embodiment of the present invention will be explained.

This embodiment combines the third electrode 6 having a shape as shown in FIG. 2A with the manner of extracting the third electrode as shown in FIG. 5A. FIG. 12A is a plan view of the image pickup tube target and the third electrode 6 viewed from the electron beam scanning side, and FIG. 12B is a schematic sectional view of the main part of the image pickup tube.

The image pickup tube target prepared in the same manner as in Embodiment 1 and the third electrode 6 made of SUS304 (which has a thickness of 0.2 mm, an opening window of 9.0 mm ×15.0 mm, an outer peripheral diameter of 23 mm and a gap from the porous surface layer 4 of 0.5 mm) are sealed within the bulb 8 by an indium ring 10 and the inside of the bulb 8 is vacuum-sealed. Thus, the image pickup tube provided with the third electrode is completed.

The image pickup tube according to this embodiment has a smaller overlapping area of the target electrode 2 and the third electrode 6 than that of Embodiments 1 and 2 so that it provides a small floating capacitance and so advantageous in terms of S/N.

Embodiment 4

Figure 13A:
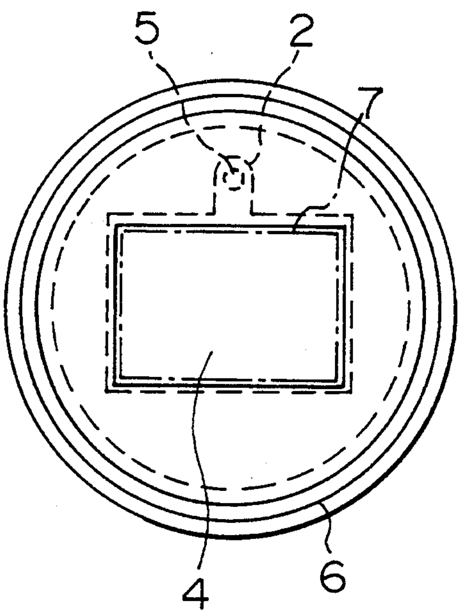
Figure 13B:
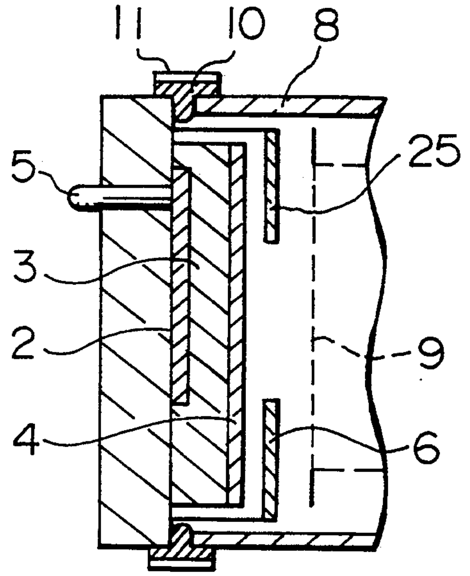

Referring to FIGS. 13A and 13B, the fourth embodiment of the present invention will be explained.

This embodiment combines the third electrode 6 having a shape as shown in FIG. 2B with the manner of extracting the third electrode as shown in FIG. 5A. FIG. 13A is a plan view of the image pickup tube target and the third electrode 6 viewed from the electron beam scanning side, and FIG. 13B is a schematic sectional view of the main part of the image pickup tube.

The image pickup tube is fabricated as follows. First, a bore is made in a transparent glass substrate 1 having a size of ⅔ inch ϕ and a signal electrode pin 5 is fused into the bore. A transparent conductive film is formed on one side of the glass substrate 1 as a target electrode 2 by CVD in an oxygen gas atmosphere; the transparent conductive film is mainly made of $SnO_2$ and has an area of 7.4 mm ×9.4 mm and a thickness of 30 nm. A blocking layer (not shown) for preventing hole injection which is made of $SiO_2$ and has a diameter of 14 mmϕ and a thickness of 10 nm is formd on the target electrode 2 by sputtering. A photo-conductive film 3 mainly made of hydric amorphous silicon and having a diameter of 14 mmϕ and a thickness of 5 μm is formed on the blocking layer by sputtering. $Sb_2S_3$ is evaporated on the photo-conductive film 3 in an atmosphere of Ar gas under the pressure of 0.3 Torr thereby to form a porous surface layer 4 having a diameter of 20 mm and a thickness of 0.1 μm. Thus, the image pickup tube target is completed.

The third electrode 6 made of SUS 304 (which has a thickness of 0.1 mm, an opening window of 7.0 mm ×9.0 mm, an outer diameter of 23 mmϕ and a gap from the porous surface layer 4 of 50 μm) is separately prepared. $Sb_2S_3$ is evaporated on the surface of the third electrode 6 in an atmosphere of Ar gas under the pressure of 0.3 Torr thereby to form a layer 0.2 μm thick for preventing secondary electron emission. The image pickup tube target 6 and third electrode thus prepared are sealed within a bulb 8 by an indium ring 10 and the inside of the bulb 8 is vacuum-sealed. Thus, the image pickup tube provided with the third electrode is completed.

The image pickup tube according to this embodiment has an effect of suppressing the number of secondary electrons generated from the third electrode 6 itself when a voltage is applied to the third electrode 6.

Embodiment 5

Figure 14A:
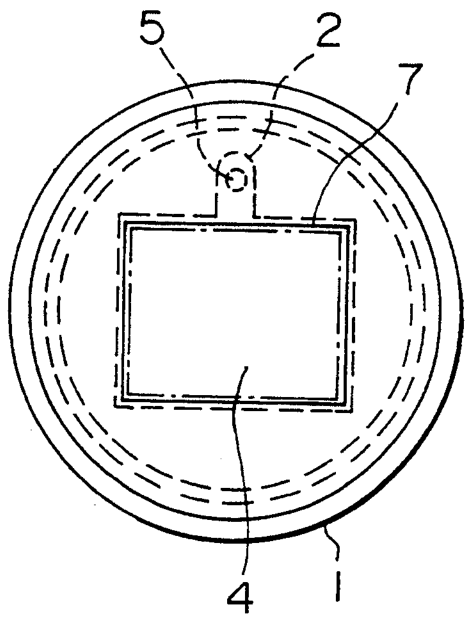
Figure 14B:
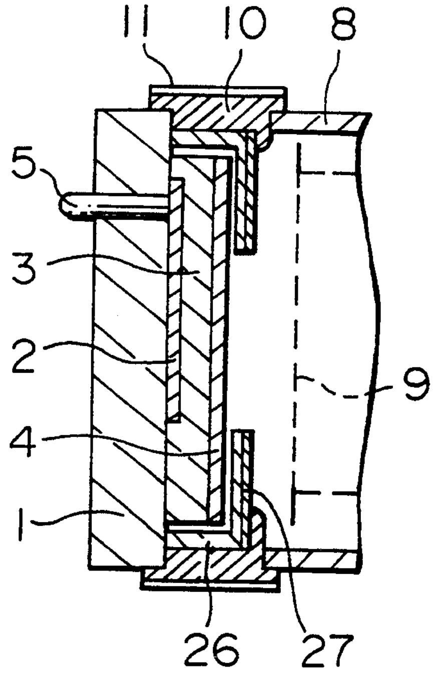

Referring to FIGS. 14A and 14B, the fifth embodiment of the present invention will be explained.

This embodiment combines the third electrode 6 having a shape as shown in FIG. 2B with the manner of extracting the third electrode as shown in FIG. 5A. FIG. 14A is a plan view of the image pickup tube target and the third electrode viewed from the electron beam scanning side, and FIG. 14B is a schematic sectional view of the main part of the image pickup tube.

The image pickup tube is fabricated as follows. First, a bore is made in a sapphire substrate 1 having a size of ⅔ inch ϕ and a signal electrode pin 5 is fused into the bore. A transparent conductive film is formed on one side of the glass substrate 1 as a target electrode 2 by activated evaporation in an oxygen gas atmosphere; the transparent conductive film is made of mainly made of $In_2O_3$ and has an area of 7.4 mm ×9.4 mm and a thickness of 20 nm. A blocking layer (not shown) for preventing hole injection which is made of $CeO_2$ and has a diameter of 14 mmϕ and a thickness of 15 nm is formed on the target electrode 2 by vacuum evaporation. A photo-conductive film 3 of amorphous semiconductor mainly containing Se and having a diameter of 14 mmϕ and a thickness of 8 μm is formed on the blocking layer by vacuum evaporation. $Sb_2S_3$ is evaporated on the photo-conductive film 3 in an atmosphere of Ar gas under the pressure of 0.25 Torr thereby to form a porous surface layer 4 having a diameter of 14 mmφ and a thickness of 0.1 μm. Thus, the image pickup tube target is completed.

An insulating surface layer 26 mainly made of glass (which has a thickness of 0.3 mm, an opening window of 7.0 mm ×9.0 mm, an outer diameter of 15 mmφ and a gap from the porous surface layer 4 of 100 μm) is separately prepared. An aluminum layer having a thickness of 1 μm is evaporated on the surface of the insulating thin plate 27 to form a conductive film 26. This conductive film 27 is used as the third electrode. The image pickup tube target and third electrode 27 thus prepared are sealed within a bulb 8 by an indium ring 10 and the inside of the bulb 8 is vacuum-sealed. Thus, the image pickup tube provided with the third electrode is completed.

In this embodiment, the insulating thin plate 26 provided between the target electrode 2 and the third electrode 6 serves to prevent vacuum discharge from occurring between the target electrode 2 and the third electrode 6.

Embodiment 6

Figure 15A:
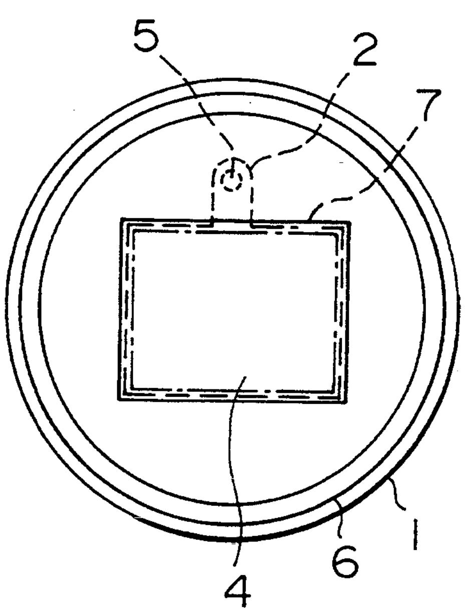
Figure 15B:
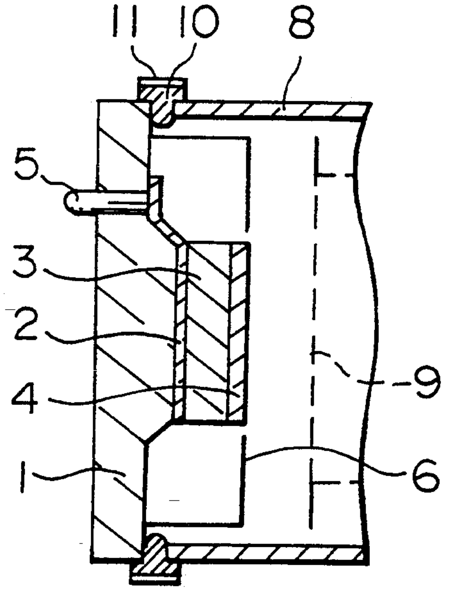

Referring to FIGS. 15A and 15B, the sixth embodiment of the present invention will be explained.

This embodiment combines the third electrode 6 having a shape as shown in FIG. 2B with the manner of extracting the third electrode as shown in FIG. 5A. FIG. 15A is a plan view of the image pickup tube target and the third electrode 6 viewed from the electron beam scanning side, and FIG. 15B is a schematic sectional view of the main part of the image pickup tube.

The image pickup tube is fabricated as follows. First, a bore is made in a convex transparent glass substrate 1 having a size of 1 inch φ and a signal electrode pin 5 is fused into the bore. A transparent conductive film is formed on the concave portion of the glass substrate 1 as a target electrode 2 by activated evaporation in an oxygen gas atmosphere; the transparent conductive film is mainly made of $In_2O_3$ and an area of 10.4 mm ×16.4 mm and a thickness of 25 nm. A blocking layer (not shown) for preventing hole injection which is made of $CeO_2$ and has an area of 10.4 mm ×16.4 mm and a thickness of 12 nm is formed on the target electrode 2 by vacuum evaporation. A photo-conductive film 3 of amorphous semiconductor mainly containing Se and having an area of 10.4 mm ×16.4 mm and a thickness of 20 μm is formed on the blocking layer by vacuum evaporation. $Sb_2S_3$ is evaporated on the photo-conductive film 3 in an atmosphere of Ar gas under the pressure of 0.35 Torr thereby to form a porous surface layer 4 having an area of 10.4 mm ×16.4 mm and a thickness of 0.1 μm. Thus, the image pickup tube target is prepared.

The image pickup tube target thus prepared and the third electrode 6 made of SUS304 having a thickness of 0.1 mm, an opening window of 11.0 mm ×17.0 mm and an outer diameter of 23 mmφ are sealed within a bulb 8 and the inside of the bulb 8 is vacuum-sealed.

It should be noted that in this embodiment, the third electrode 6 is located on the same horizontal plane as the porous surface layer 4. This permits the image pickup tube target and the third electrode 6 to be located on the same plane. Therefore, in this embodiment, provision of the third electrode does not affect scanning an electron beam.

Embodiment 7

Figure 16A:
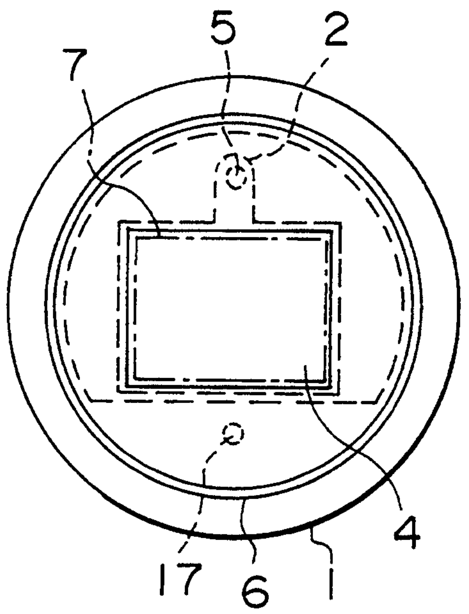
Figure 16B:
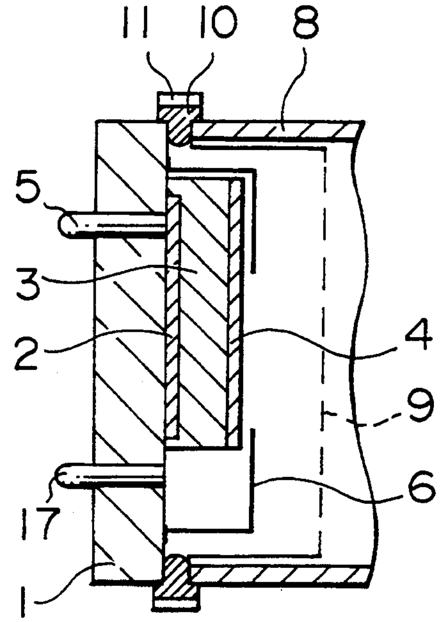

Referring to FIGS. 16A and 16B, the seventh embodiment of the present invention will be explained.

This embodiment combines the third electrode 6 having a shape as shown in FIG. 2B with the manner of extracting the third electrode as shown in FIG. 5C. FIG. 16A is a plan view of the image pickup tube target and the third electrode 6 viewed from the electron beam scanning side, and FIG. 16B is a schematic sectional view of the main part of the image pickup tube.

The image pickup tube is fabricated as follows. First, two bores are made in a transparent glass substrate 1 having a size of 1 inch φ, and a signal electrode pin 5 and a third electrode extracting pin 17 are fused into these bores. A transparent conductive film is formed on one side of the glass substrate 1 as a target electrode 2 by activated evaporation in an oxygen gas atmosphere; the transparent conductive film is mainly made of $In_2O_3$ and has an area of 10.4 mm ×16.4 mm and a thickness of 30 nm. A blocking layer (not shown) for preventing hole injection which is made of $CeO_2$ and has a diameter of 20 mmφ and a thickness of 15 nm is formed on the target electrode 2 except the neighborhood of the third electrode extracting pin 17 by vacuum evaporation. A photo-conductive film 3 of amorphous semiconductor mainly made of Se and having the same shape as the blocking layer and a thickness of 10 μm is formed on the blocking layer by vacuum evaporation. $Sb_2S_3$ is evaporated on the photo-conductive film 3 in an atmosphere of Ar gas under the pressure of 0.2 Torr thereby to form a porous surface layer 4 having a thickness of 0.1 μm and having a shape similar to the blocking layer. Thus, the image pickup tube target is prepared.

Connected with the third electrode extracting pin 17 of the image pickup tube target thus prepared is the third electrode 6 made of SUS304 having a thickness of 0.1 mm, an opening window of 9.0 mm ×15.0 mm and an outer peripheral diameter of 21 mmφ. The resultant substrate is sealed within a bulb 8 by an indium ring 10 and the inside of the bulb 8 is vacuum-sealed. Thus, the image pickup tube provided with the third electrode can be prepared.

In this embodiment, the third electrode 6 is connected with the third electrode extracting pin 17 but not the indium ring 10 so that the indium ring 10 can be used for the other use; for example, the mesh electrode 9 can be arranged to be electrically connected with the indium ring 10.

Embodiment 8

Figure 17A:
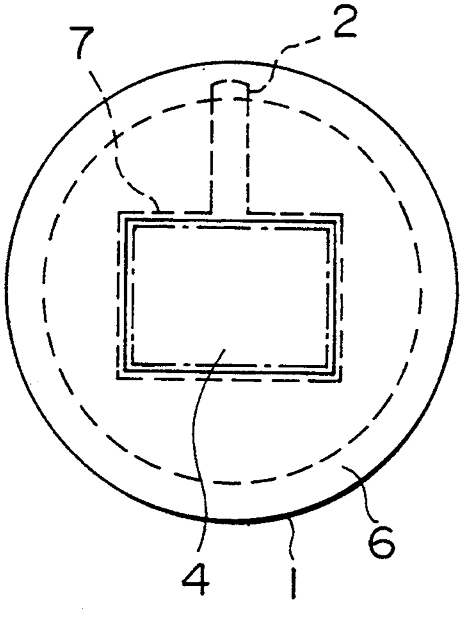
Figure 17B:
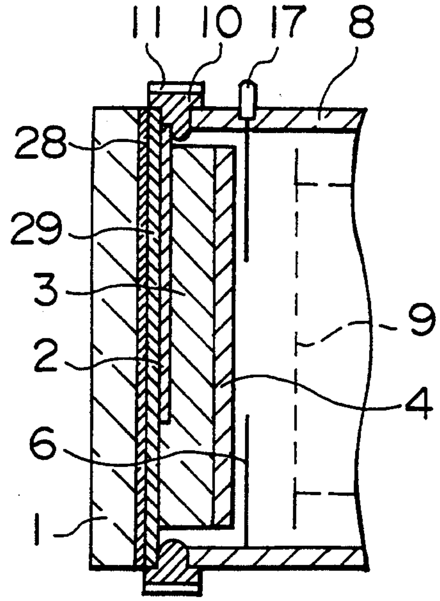

Referring to FIGS. 17A and 17B, the eighth embodiment of the present invention will be explained.

This embodiment combines the third electrode 6 having a shape as shown in FIG. 2B with the manner of extracting the third electrode as shown in FIG. 5D. FIG. 17A is a plan view of the image pickup tube target and the third electrode 6 viewed from the electron beam scanning side, and FIG. 17B is a schematic sectional view of the main part of the image pickup tube.

The image pickup tube according to this embodiment is fabricated as follows. First, one surface of a beryllium substrate 1 having a size of 1 inch and a thickness of 0.5 mm is optically polished and a thin glass plate having a size of 1 inch and a thickness of 30 μm is bonded to the substrate 1 by bonding agent 28. An aluminum film having an area of 10.4 mm ×16.4 mm and a thickness of 10 nm is formd on one side of the glass substrate 1 as a target electrode 2 by activated evaporation. A blocking layer (not shown) for preventing hole injection which is made of $CeO_2$ and has a diameter of 20 mmϕ and a thickness of 20 nm is formed on the target electrode 2 by vacuum evaporation. A photo-conductive film 3 of amorphous semiconductor mainly containing Se and having a diameter of 20 mmϕ and a thickness of 30 μm is formed on the blocking layer by vacuum evaporation. CdTe is evaporated on the photo-conductive film 3 in an atmosphere of Ar gas under the pressure of 0.4 Torr thereby to form a porous surface layer 4 having a diameter of 20 mmϕ and a thickness of 0.1 μm. Thus, the image pickup tube target is prepared.

Separately, the third electrode 6 made of SUS304 having an opening window of an area of 9.0 mm ×15.0 mm or more is attached to a bulb 8 at a position to provide a gap of 0.5 mm from the porous surface layer 4 in such a manner that it is kept in contact with a third electrode extracting pin 17. The image pickup tube and bulb 8 thus prepared are sealed by an indium ring 10, and the inside of the bulb is vacuum-sealed. Thus, the image pickup tube provided with the third electrode can be completed.

The image pickup tube has an advantage that the target electrode 2 can be arranged to be connected with the indium ring 10.

Embodiment 9

Figure 18A:
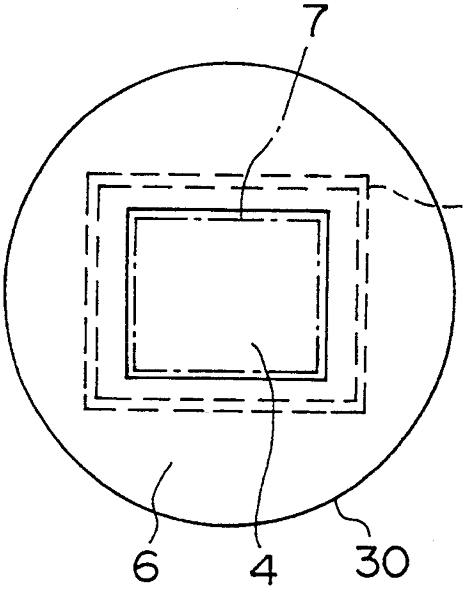
Figure 18B:
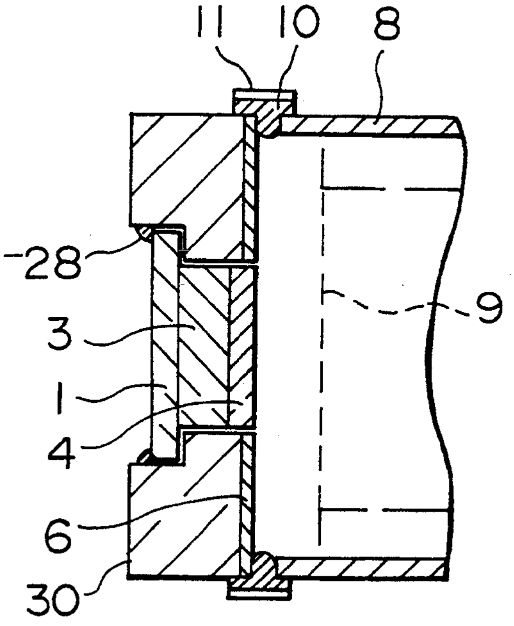

Referring to FIGS. 18A and 18B, the ninth embodiment of the present invention will be explained.

This embodiment combines the third electrode 6 having a shape as shown in FIG. 2B with the manner of extracting the third electrode as shown in FIG. 5A. FIG. 18A is a plan view of the image pickup tube target and the third electrode 6 viewed from the electron beam scanning side, and FIG. 18B is a schematic sectional view of the main part of the image pickup tube.

The image pickup tube according to this embodiment is fabricated as follows. First, one surface of a beryllium substrate 1 having an area of 13.0 mm ×19.0 mm and a thickness of 0.5 mm is optically polished. A blocking layer (not shown) for preventing hole injection which is made of $CeO_2$ and has an area of 10.4 mm ×16.4 mm and a thickness of 15 nm is formd on the polished surface of the substrate 1 by vacuum evaporation. A photo-conductive film 3 of amorphous semicondcutor mainly made of Se and having an area of 10.4 mm ×16.4 mm and a thickness of 20 μm is formed on the blocking layer by vacuum evaporation. $Sb_2S_3$ is evaporated on the photo-conductive film 3 in an atmosphere of Ar gas under the pressure of 0.3 Torr thereby to form a porous surface layer 4 having an area of 10.4 mm ×16.4 mm and a thickness of 0.1 μm. Using bonding agent 28, the resultant substrate 1 is fixed to a glass substrate 30 on its one surface of which the third electrode 6 mainly made of aluminum and having a thickness of 0.5 μm is formed by vacuum evaporation. The resultant glass substrate 30 is sealed to a bulb 8 by an indium ring 10, and the inside of the bulb 8 is vacuum-sealed. Thus, an X-ray image pickup tube is prepared.

The image pickup tube according to this embodiment has an advantage that in the case where the substrate 1 is made of a conductive material, a voltage can be applied to the third electrode 6 through the indium ring 10 owing to the provision of the glass substrate 30.

Embodiment 10

Figure 19A:
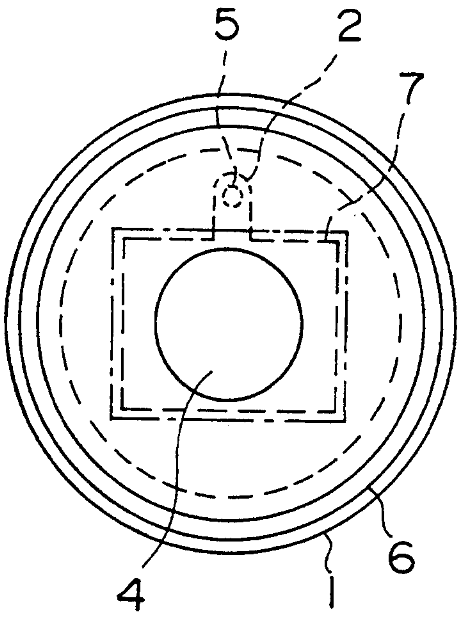
Figure 19B:
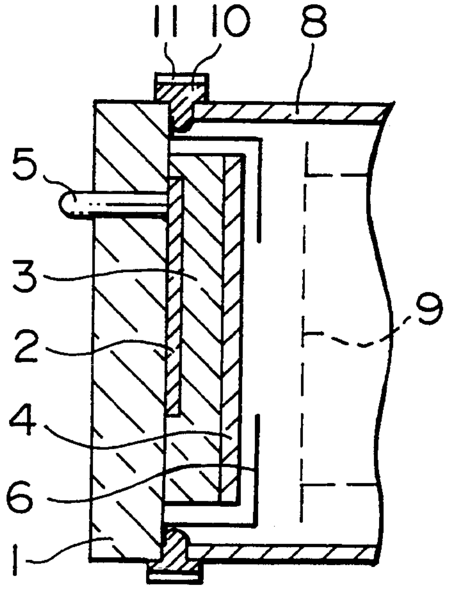

Referring to FIGS. 19A and 19B, the tenth embodiment of the present invention will be explained.

This embodiment combines the third electrode 6 having a shape as shown in FIG. 2J with the manner of extracting the third electrode as shown in FIG. 5A. FIG. 19A is a plan view of the image pickup tube target and the third electrode 6 viewed from the electron beam scanning side, and FIG. 19B is a schematic sectional view of the main part of the image pickup tube.

The image pickup tube target prepared in the same manner as in Embodiment 1 and the third electrode 6 made of SUS304 (which has a thickness of 0.1 mm, an opening window having a diameter of 8.0 mmϕ, an outer peripheral diameter of 23 mmϕ and a gap from the porous surface layer 4 of 0.1 mm) are sealed within the bulb 8 by an indium ring 10 and the inside of the bulb 8 is vacuum-sealed. Thus, the image pickup tube provided with the third electrode can be prepared.

The image pickup tube according to this embodiment has an advantage that it can be used to pick up an image in which an image output does not require a square monitoring shape, e.g. an image from a microscope.

Embodiment 11

Figure 20A:
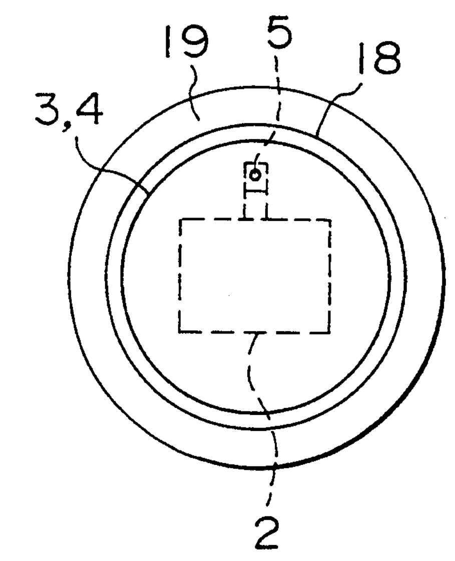
Figure 20B:
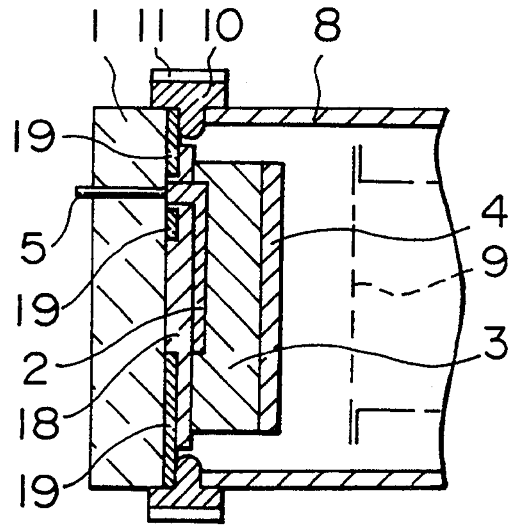

Referring to FIGS. 20A and 20B, the eleventh embodiment of the present invention will be explained.

Figure 8A:
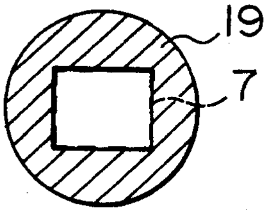
Figure 8B:
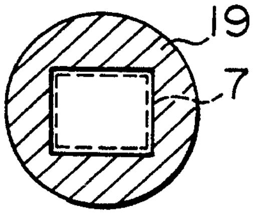
Figure 8C:
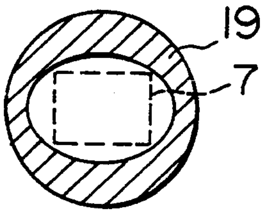

This embodiment combines the third electrode 19 having a shape as shown in FIG. 8A with the manner of extracting the third electrode as shown in FIG. 7A. FIG. 20A is a plan view of the image pickup tube target and the third electrode 19 viewed from the electron beam scanning side, and FIG. 20B is a schematic sectional view of the main part of the image pickup tube.

The image pickup tube according to this embodiment is fabricated as follows. First, a metallic chromium (Cr) film having a thickenss of 100 nm is formed, as the third electrode 19, on a portion of a transparent glass substrate 1 having a size of 1 inch ϕ other than the effective scanned region by vacuum evaporation, the portion not including the neighborhood of a signal electrode pin 5. An insulating thin film 18 mainly made of $SiO_2$ and having a diameter of 22 mmϕ and a thickness of 10 μm is formed on the resultant surface of the substrate 1 by sputtering. A bore having a diameter of 1 mmϕ is made in the substrate thus prepared and the signal electrode pin 5 is fused into the bore. A transparent conductive film is formed on the insulating film 18 as a target electrode 2 by activated evaporation in an oxygen gas atmosphere; the transparent conductive film is of mainly made of $In_2O_3$ and has an area of 10.4 mm ×16.4 mm and a thickness of 20 nm. A blocking layer (not shown) for preventing hole injection which is made of $CeO_2$ and has a diameter of 20 mmϕ and a thickness of 10–30 nm is formed on the target electrode 2 by vacuum evaporation. A photo-conductive film 3 of amorphous semiconductor mainly containing Se and having a diameter of 20 mmϕ and a thickness of 4–50 μm is formed on the blocking layer by vacuum evaporation. $Sb_2S_3$ is evaporated on the photo-condcutive film 3 in an atmosphere of Ar gas under the pressure of 0.1–0.4 Torr thereby to form a porous surface layer 4 mainly made of $Sb_2S_3$ and having a diameter of 20 mmϕ and a thickness of 0.1 μm. Thus, the image pickup tube target is prepared.

The image pickup tube target thus prepared is sealed by an indium ring to be built into a bulb 8, and the inside of the bulb 8 is vacuum-sealed. Thus, the image pickup tube provided with the third electrode is prepared.

The image pickup tube according to this embodiment has an advantage that the effect of introducing the third electrode 19 is remarkable since it can be made thin without injuring the insulating property of the insulating thin film 18.

Embodiment 12

Figure 21A:
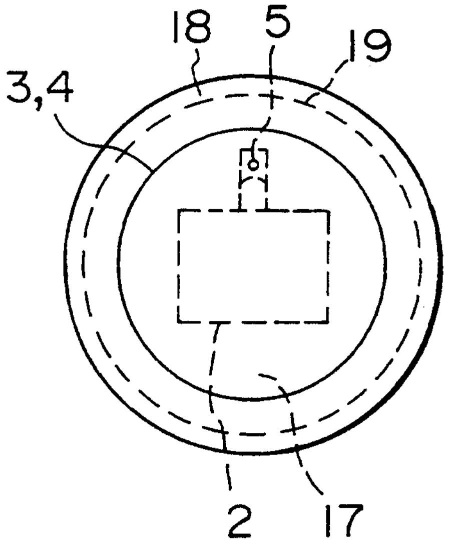
Figure 21B:
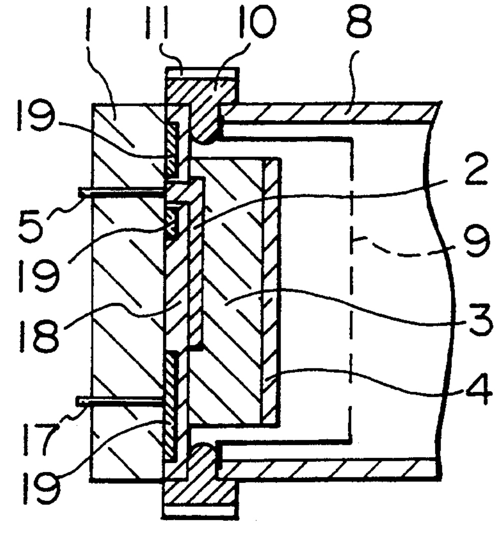

Referring to FIGS. 21A and 21B, the twelfth embodiment of the present invention will be explained.

This embodiment combines the third electrode 19 having a shape as shown in FIG. 8A with the manner of extracting the third electrode as shown in FIG. 7B. FIG. 21A is a plan view of the image pickup tube target and the third electrode 6 viewed from the electron beam scanning side, and FIG. 21B is a schematic sectional view of the main part of the image pickup tube.

The image pickup tube according to this embodiment is fabricated as follows. First, a metallic aluminum film having a thickness of 200 nm is formed, as the third electrode 19, on a portion of a sapphire substrate 1 having a size of 1 inch other than the effective scanned region by vacuum evaporation, the portion not including the neighborhood of a signal electrode pin 5. A thin glass plate 18 having a size of 1 inch and a thickness of 20 μm is bonded on the resultant surface by bonding agent. Two bores each having a diameter of 1 mmϕ are made in the substrate thus prepared and the signal electrode pin 5 and a third electrode extracting pin 17 are fused into these bores. A transparent conductive film is formed on the insulating film 18 as a target electrode 2 by activated evaporation in an oxygen gas atmosphere; the transparent conductive film is mainly made of $In_2O_3$ and has an area of 10.4 mm ×16.4 mm and a thickness of 20 nm. A blocking layer (not shown) for preventing hole injection which is made of $CeO_2$ and has a diameter of 20 mmϕ and a thickness of 10–30 nm is formed on the target electrode 2 by vacuum evaporation. A photo-conductive film 3 of amorphous semiconductor mainly made of Se and having a diameter of 20 mmϕ and a thickness of 4–50 μm is formed on the blocking layer by vacuum evaporation $Sb_2S_3$ is evaporated on the photo-conductive film 3 in an atmosphere of Ar gas under the pressure of 0.1–0.4 Torr thereby to form a porous surface layer 4 mainly made of $Sb_2S_3$ having a diameter of 20 mmϕ and a thickness of 0.1 μm. Thus, the image pickup tube target is prepared.

The image pickup tube target thus prepared is sealed by an indium ring 10 to be built into a bulb 8, and the inside of the bulb 8 is vacuum-sealed. Thus, the image pickup tube provided with the third electrode is prepared.

In the image pickup tube according to this embodiment, the third electrode 19 and the target electrode 2 are connected with two electrode pins 17 and 5, respectively, so that the indium ring 10 can be used to extract the mesh electrode. 9. Therefore, this embodiment is preferably applied to an image pickup tube in which an electron beam deflecting electrode is provided on the inner wall of a bulb.

Embodiment 13

Figure 22A:
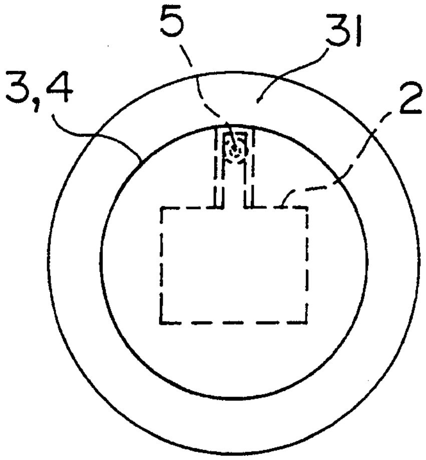
Figure 22B:
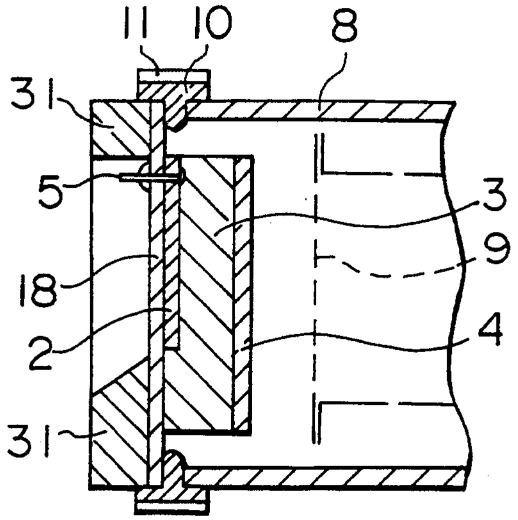

Referring to FIGS. 22A and 22B, the thirteenth embodiment of the present invention will be explained.

Figure 8D:
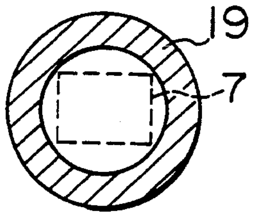
Figure 8E:
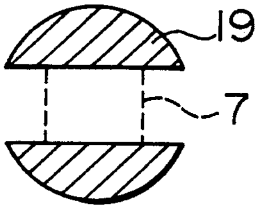
Figure 8F:
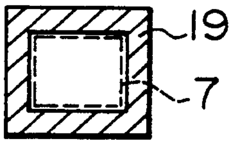
Figure 8G:
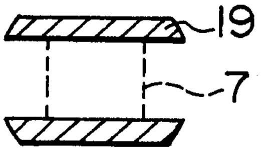
Figure 8H:
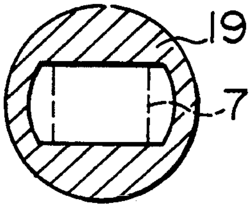
Figure 8I:
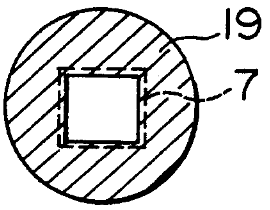
Figure 8J:
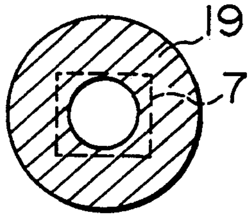

This embodiment combines the third electrode having a shape as shown in FIG. 8D with the manner of extracting the third electrode as shown in FIG. 7A. FIG. 22A is a plan view of the image pickup tube target and the third electrode 6 viewed from the electron beam scanning side, and FIG. 22B is a schematic cross-sectional view of the main part of the image pickup tube.

The image pickup tube according to this embodiment is fabricated as follows. First, a metallic plate having a window therein, being made of SUS304 and being 2 mm thick is bonded as the third electrode 31 to one surface of an insulating thin film 18 made of BN and 0.2 mm thick using bonding agent. The conductive layer having an area of 7.4 mm ×9.4 mm and a thickness of 30 nm is formed as a target electrode 2 on the other surface of the insulating thin film 18. A signal extracting bore for fixing a signal electrode pin 5 is made through the insulating thin film 18 of BN, and the signal electrode pin 5 is fixed using conductive bonding agent. Further, in order to prevent vacuum leak and increase the mechanical strength, the neighborhood of the pin 5 on the side exposed to air is fixed using insulating bonding agent. A blocking layer (not shown) for preventing hole injection which is made of $CeO_2$ and has a diameter of 14 mmϕ and a thickness of 10–30 nm is formed over the target electrode by vacuum evaporation. A photo-conductive film 3 of amorphous semiconductor mainly containing Se and having a diameter of 14 mmϕ and a thickness of 4–50 μm is formed on the blocking layer by vacuum evaporation. $Sb_2S_3$ is evaporated on the photo-conductive film 3 in an atmosphere of Ar gas under the pressure of 0.1–0.4 Torr thereby to form a porous layer 4 mainly made of $Sb_2S_3$ having a diameter of 14 mmϕ and a thickness of 0.1 μm. Thus, the image pickup tube target is prepared.

The image pickup tube target thus prepared is sealed by an indium ring 10 to be built into a bulb 8, and the inside of the bulb 8 is vacuum-sealed. Thus, the X-ray image pickup tube provided with the third electrode 31 is prepared.

The image pickup tube according to this embodiment has an advantage that since a metallic plate is used as the third electrode, the X-rays incident from the non-scanned region can be shaded and the mechanical strength of the image pickup tube target can be increased.

Embodiment 14

Figure 23A:
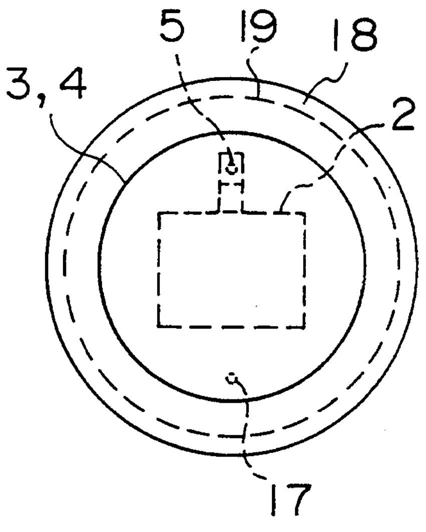
Figure 23B:
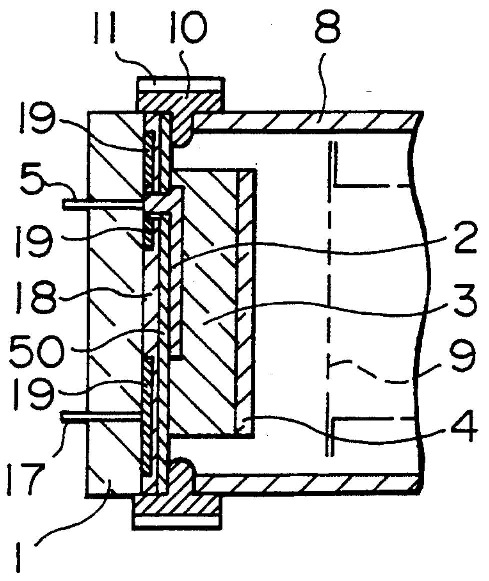

Referring to FIGS. 23A and 23B, the fourteenth embodiment of the present invention will be explained.

This embodiment combines the third electrode 19 having a shape as shown in FIG. 8A with the manner of extracting the third electrode as shown in FIG. 7B. FIG. 23A is a plan view of the image pickup tube target and the third electrode 19 viewed from the electron beam scanning side, and FIG. 23B is a schematic sectional view of the main part of the image pickup tube.

The image pickup tube according to this embodiment is fabricated as follows. First, a BN substrate having a size of 1 inch previously provided with a target electrode pin 5 and a third electrode pin 17 is prepared. A metallic chromium (Cr) film having a thickness of 200 nm is formed, as the third electrode 19, on a portion of the substrate 1 other than the effective scanned region by vacuum evaporation, the portion not including the neighborhood of a target electrode pin 5. A polyimide polymer thin film 18 is formed as an insulating thin film 18, on the resultant surface by the ordinary coating method. The substrate 1 is heat-treated at 250° C. for 30 minutes to provide the insulating film 18 having a thickness of 1 μm on the surface thereof. In order to improve the smoothness of the substrate surface and prevent gas from being radiated from the insulating film 18, an $As_2Se_3$ film 50 having a size of 1 inch and a thickness of 4 μm is formed on the insulating film 18 by the vacuum evaporation at the substrate temperature at 150° C. Portions of the insulating thin film 18 and the $As_2Se_3$ film 50 according to the target electrode pin 5 previously prepared are removed. A transparent conductive film is formed on the $As_2Se_3$ film 50 as a target electrode 2 by activated evaporation in an oxygen gas atmosphere; the transparent conductive film is mainly made of $In_2O_3$ and an area of 10.4 mm × 16.4 mm and a thickness of 20 nm. A blocking layer (not shown) for preventing hole injection which is made of $CeO_2$ and has a diameter of 20 mmϕ and a thickness of 10–30 nm is formed on the target electrode 2 by vacuum evaporation. A photo-conductive film 3 of amorphous semiconductor mainly containing Se and having a diameter of 20 mmϕ and a thickness of 4–50 μm is formed on the blocking layer by vacuum evaporation. $Sb_2S_3$ is evaporated on the photo-conductive film 3 in an atmosphere of Ar gas under the pressure of 0.1–0.4 Torr thereby to form a porous layer 4 having a diameter of 20 mmϕ and a thickness of 0.1 μm. Thus, the image pickup tube target is prepared.

The image pickup tube target thus prepared is sealed by an indium ring 10 to be built into a bulb 8, and the inside of the bulb 8 is vacuum-sealed. Thus, an X-ray image pickup tube provided with the third electrode is prepared.

The image pickup tube according to this embodiment has an advantage that the insulating film 18 can be made thin so that loss of an incident X-ray image can be decreased to provide an X-ray image with high sensitivity.

Embodiment 15

Figure 24A:
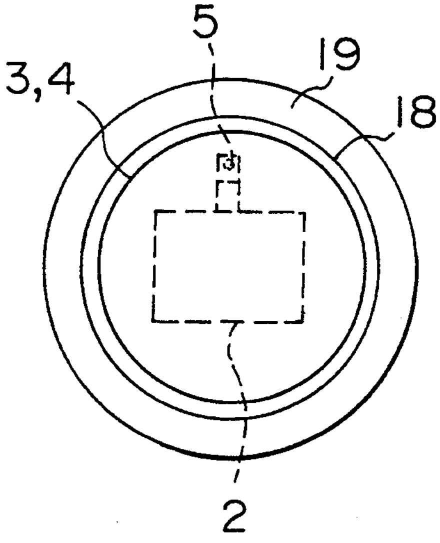
Figure 24B:
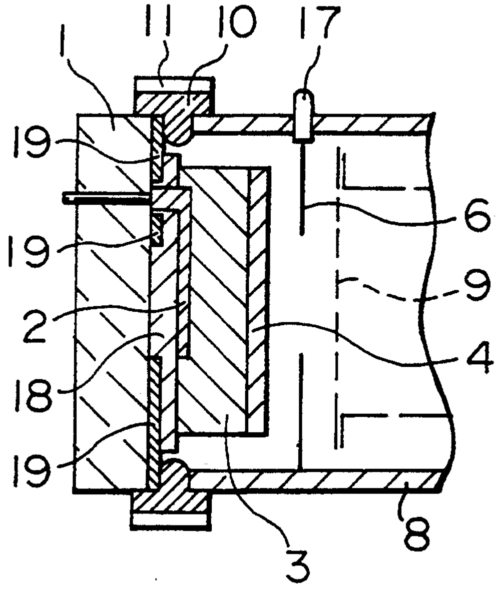

Referring to FIGS. 24A and 24B, the fifteenth embodiment of the present invention will be explained.

This embodiment combines the third electrodes 6 and 19 having shapes as shown in FIGS. 2A and 2B with the manners of extracting the third electrodes as shown in FIGS. 5D and 7A. FIG. 24A is a plan view of the image pickup tube target and the third electrode 6 viewed from the electron beam scanning side, and FIG. 24B is a schematic cross-sectional view of the main part of the image pickup tube.

Using an indium ring 10, the image pickup tube target provided with the third electrode 19 fabricated by the same manner as in Embodiment 11 is sealed to the bulb 8 to which the third electrode extracting pin 17 kept in contact with the third electrode 6 is attached. The inside of the bulb 8 is vacuum-sealed to prepare the image pickup tube provided with the image pickup tube provided with the two third electrodes 6 and 19.

The image pickup tube has an advantage that the effect of introducing the third electrode is remarkable owing to using two third electrodes.

As an application, the image pickup tube prepared in Embodiments 1 to 15 is packaged in a television camera, and the camera is used with the third electrode at the same potential as the cathode potential. Then, it was confirmed that with the target voltage of 500 V or more in any image pickup tube, the undesired image phenomena such as the waterfall phenomenon and inversion phenomenon do not occur.

Embodiment 16

An image pickup equipment using one of the pickup tubes according to Embodiments 1 to 15 is shown in FIG. 9. A target voltage of 500 V or more is applied from the target power supply 21 to the image pickup tube. In FIG. 9, the sync signal generating device 23 supplies a synchronization signal to the electron beam scanning circuit 24 and the power supply 22. The power supply 22 supplies a control voltage to the third electrode 6 to suppress image distortion. If the control voltage previously stored in a memory, which is incorporated into the power supply 22, is supplied to the third electrode, the high quality image without the above undesired image phenomena can be obtained.

Embodiment 17

Figure 25:
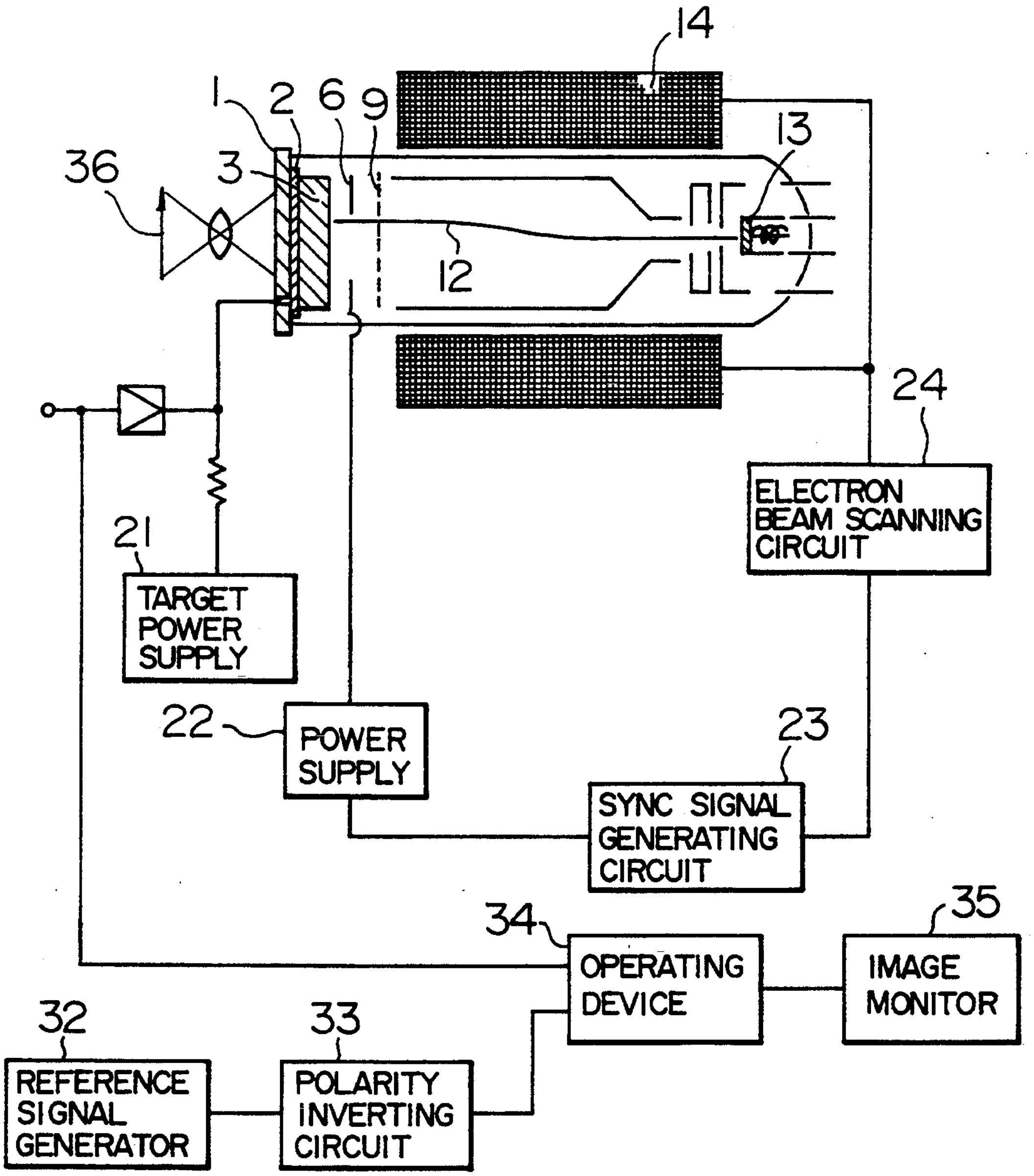
FIG. 25 is a schematic view showing one embodiment of the image pickup system according to the present invention.

An image pickup system using one of the image pickup tubes according to Embodiments 1 to 15 is shown in FIG. 25. A target voltage of 500 V or more is applied from the target power supply 21 to the image pickup tube. In this state, a test pattern 36 is picked up. The image signal thus obtained is sent to an operating device 34. On the other hand, a reference signal generator 32 electrically generates a reference test pattern signal which is sent to the operating device 34 via a polarity inverting circuit 33. These two kinds of signals supplied to the operator 34 are mainly added to be reproduced on an image monitor 35. Thus, the monitor image thus displayed results in overlap of the test pattern signals with opposite poralities. Therefore, if there is a difference between the signals from the image pickup tube and from the reference test pattern generator 32, i.e., the output from the image pickup tube includes a distortion, a double test pattern image drawn in white and black can be observed, whereas if the output from the image pickup tube includes no distortion, a single test pattern image can be observed. Thus, a criterion for deciding the image distortion can be established. Further, the power supply 22 incorporates a memory in which the control voltage can be stored; the control voltage serves to suppress the image distortion and is to be supplied to the third electrode 6 in accordance with the timing signal from a sync signal generating circuit 23.

The control voltage from the power supply 22 is varied on the basis of the above image distortion deciding criterion. Then, if the voltages permitting the double test pattern to disappear on the monitor are successively stored in the incorporated memory, the control voltages which can suppress the distortion of the entire image can be determined.

Embodiment 18

Figure 26:
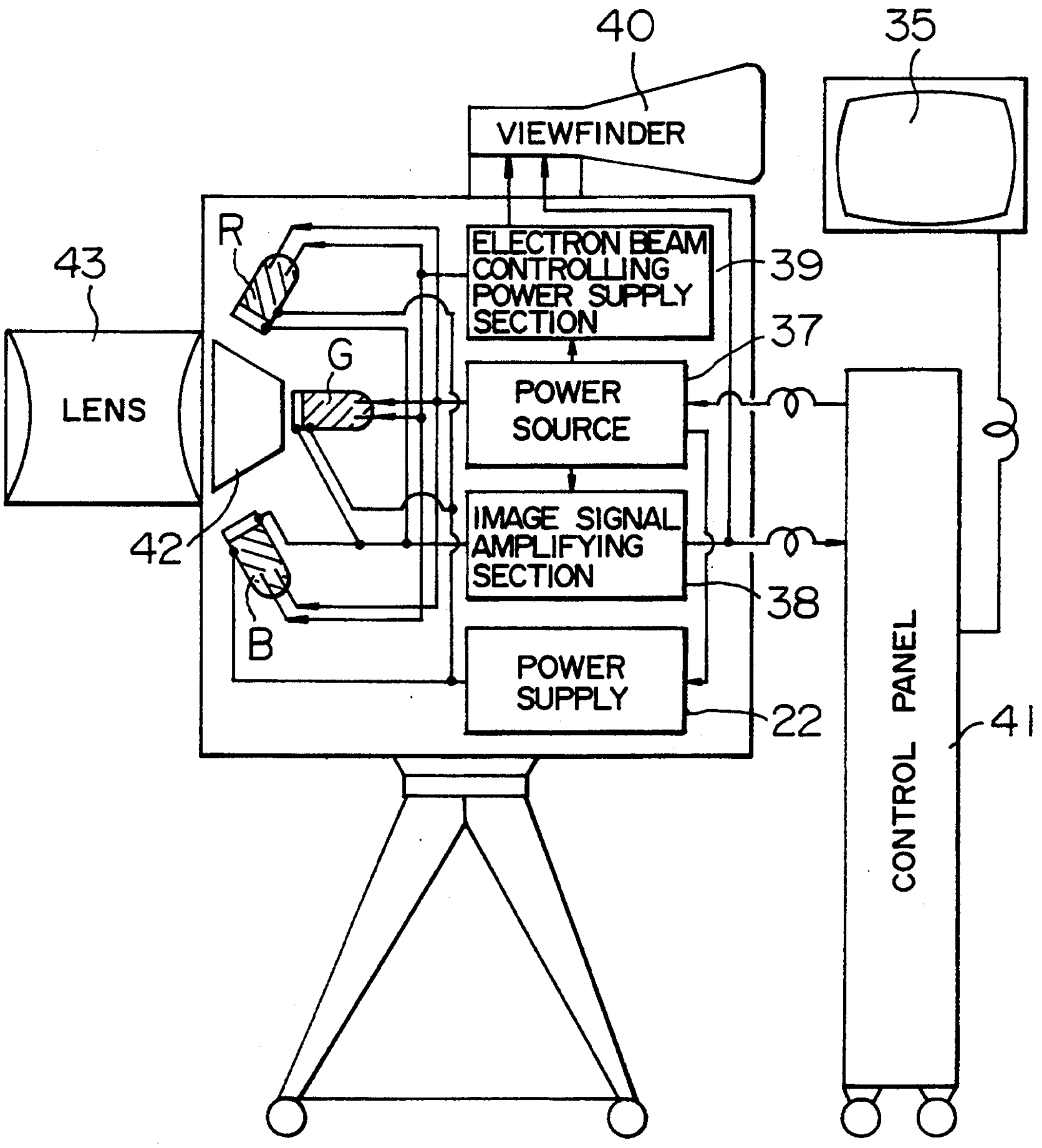
FIG. 26 is a schematic view showing the main part of a high definition television with triple image pickup tubes which uses the image pickup tube according to the present invention.

FIG. 26 is a schematic view showing the main part of a high definition television with triple image pickup tubes which uses the image pickup tube according to the present invention. In FIG. 26, symbols R, G and B denotes image pickup tubes for R, G and B channels according to the present invention, respectively; 37 a power source; 38 an image signal amplifying section; 39 an electron beam controlling power supply section; 40 a viewfinder; 41 a control panel; 42 a color separation prism; and 43 a lens. The color camera according to this embodiment is operated with the voltage applied to each of the image pickup tubes so that the potential at the target electrode is positive with respect to that at the cathode, e.g. with a electric field sufficient to cause avalanche multiplication of charges in the photo-conductive film in each of the image pickup tubes. In this case, the image pickup tube according to Embodiment 5 provided with the photo-conductive film of amorphous semiconductor mainly containing amorphous Se and having a thickness of 8 μm is packaged in the camera, and operated under the condition of the target voltage of 880 V, the third electrode at the cathode potential and the number of scanning lines of 1125. Then, the camera according to this embodiment can provide a high definition image with sensitivity which is about 100 times as high as in the conventional color camera and also free from undesired image phenomena such as the image distortion, shading, waterfall phenomenon and inversion phenomenon described previously.

Embodiment 19

Figure 27:
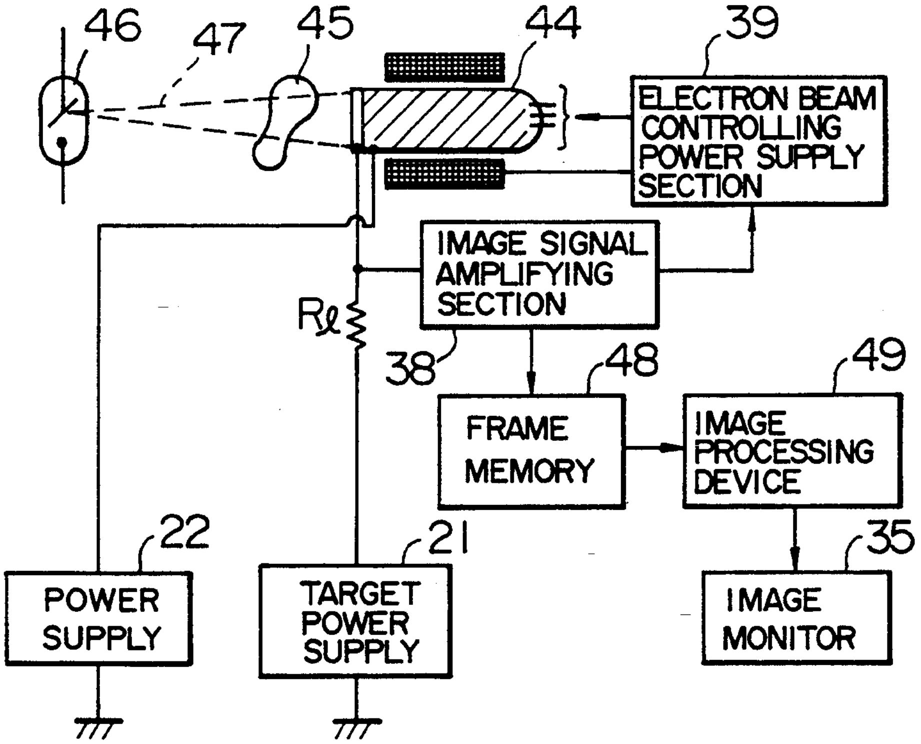
FIG. 27 is a view showing the arrangement of an X-ray image analysis system provided with the X-ray image pickup tube according to the present invention.

FIG. 27 is a schematic diagram of an X-ray image analyzing system provided with the X-ray image pickup tube according to the present invention. In FIG. 27, 44 denotes an X-ray image pickup tube according to the present invention; 45 an object to be examined using the X-ray; 46 an X-ray source; 47 radiated X-rays; 48 a frame memory; 49 an image processing device; and $R_l$ a load resistance.

As one embodiment, the image pickup tube according to Embodiment 9 provided with the photo-conductive film containing amorphous Se and having a thickness of 20 μm is packaged in the X-ray image analyzing system shown in FIG. 27 and operated under the condition of the target voltage of 2000 V, and mesh electrode at the cathode potential. Then, avalanche multiplication of charges can be caused in the photo-conductive film without generating the undesired image phenomena such as the image distortion, shading, waterfall phenomenon and inversion phenomenon described previously so that the X-ray image analysis can be implemented with high sensitivity and high S/N.

The present invention can provide an image pickup tube which can be operated with an enhanced voltage at the target electrode or the mesh electrode without generating the undesired phenomena such as the image distortion, shading, waterfall phenomenon and inversion phenomenon. Therefore, in accordance with the present invention, several characteristics of sensitivity, resolution, lag, etc. can be greatly improved thereby to realize a high quality image pickup system.

The image pickup tube according to the present invention is most suitable to a television camera, particularly a high definition camera, and the X-ray image analyzing system provided with this image pickup tube can realize signal processing with high S/N.

The image pickup tube provided with third electrode according to Embodiments 1 to 15 of the present invention, packaged into the television camera, is operated with the target voltage of 500 V or more. In this case, it was confirmed that with the third electrode set for the cathode potential or a predetermined potential, the television camera provided with the image pickup tube according to any of Embodiments 1 to 15 does not cause the undesired image phenomena such as the shading as described previously.

It is further understood that by those skilled in the art that the foregoing description is on preferred embodiments of the disclosed device and that various changes and modifications may be made in the invention without departing from the spirit and scope thereof.

We claim:

1. An image pickup device comprising:
an image pickup tube including
an image pickup tube target section including at least a photo-conductive film and a target electrode,
a mesh electrode located in opposition to said target section,
scanning beam emitting means including a cathode electrode for emitting electrons and means for scanning the electron beam, said scanning beam emitting means being opposed to the mesh electrode and located on the side opposite to the target section with respect to the mesh electrode, and
a control electrode insulated from the target section, for controlling the surface potential of the non-scanned region of the target section while the image pickup tube operates;
a first voltage applying means for applying a voltage to said target electrode;
a second voltage applying means for applying a voltage to said control electrode;
circuit means for scanning the electron beam; and
sync signal generating means for supplying a synchronization signal necessary to scan the electron beam to said circuit means and supplying a timing pulse to said second voltage applying means.

2. An image pickup tube according to claim 1, wherein said photo-conductive film is made of an amorphous material mainly containing Se.

3. A method for operating the image pickup tube set forth in claim 2, comprising the steps of applying to said control electrode a voltage lower than that to be applied to the target electrode, and applying to said photo-conductive film an electric field of $0.8\times10^6$ V/cm or more.

4. A method for operating the image pickup tube set forth in claim 1, comprising the step of applying to said control electrode a voltage lower than that to be applied to the target electrode.

5. An image pickup tube according to claim 1, wherein said control electrode is located between said image pickup tube target section and mesh electrode, insulated from said mesh electrode and located on said non-scanned region.

6. An image pickup tube according to claim 5, wherein said control electrode has, on its surface, a layer which is difficult to emit secondary electrons.

7. An image pickup tube according to claim 6, wherein said layer which is difficult to emit secondary electrons is a porous thin film mainly made of $Sb_2S_3$, $As_2Se_3$ or CdTe.

8. An image pickup tube according to claim 5, wherein said control electrode is located on an insulating layer formed on the non-scanned region surface of said target section.

9. An image pickup tube according to claim 8, wherein said insulating layer is a single layer or a composite layer formed by stacking two or more single layers, the single layer being made of at least one selected from the group consisting of an oxide, a fluoride, a nitride, silicon carbide, zinc sulfide, a polyimide polymer and an epoxy polymer, said oxide being an oxide of at least one selected from the group consisting of Mg, Al, Si, Ti, Mn, Zn, Ge, Y, Nb, Sb, Ta and Bi or a mixture of oxides of at least two of these elements, said fluoride being a fluoride of at least one selected from the group consisting of Li, Na, Mg, Al, K, Ca, Ge, Sr, Ln and Ba or a mixture of fluorides of at least two of these elements, said nitride being a nitride of at least one selected from the group consisting of B, Al and Si or a mixture of nitride of at least two of these elements.

10. An image pickup tube according to claim 5, wherein said control electrode is located on an insulating layer formed on a peripheral portion of that surface of said mesh electrode which faces said image pickup tube target section.

11. An image pickup tube according to claim 10, wherein said insulating layer is a single layer or a composite layer formed by stacking two or more single layers, the single layer being made of at least one selected from the group consisting of an oxide, a fluoride, a nitride, silicon carbide, zinc sulfide, a polyimide polymer and an epoxy polymer, said oxide being an oxide of at least one selected from the group consisting of Mg, Al, Si, Ti, Mn, Zn, Ge, Y, Nb, Sb, Ta and Bi or a mixture of oxides of at least two of these elements, said fluoride being a fluoride of at least one selected from the group consisting of Li, Na, Mg, Al, K, Ca, Ge, Sr, Ln and Ba or a mixture of fluorides of at least two of these elements, said nitride being a nitride of at least one selected from the group consisting of B, Al and Si or a mixture of nitride of at least two of these elements.

12. An image pickup tube according to claim 5, wherein said control electrode is insulated from said target section and said mesh electrode through a vacuum.

13. An image pickup tube according to claim 5, wherein said control electrode has a square opening window in its center portion.

14. An image pickup tube according to claim 5, wherein said control electrode has a circular opening window in its center portion.

15. An image pickup tube according to claim 5, wherein said control electrode has an elliptical opening window in its center portion.

16. An image pickup tube according to claim 5, wherein said control electrode is made of metal.

17. An image pickup tube according to claim 5, wherein said control electrode is coarse on at least its side opposed to said mesh electrode.

18. A method for operating an image pickup tube, the image pickup tube comprising:

a substrate;

a target section including at least a photo-conductive film and a target electrode provided on said substrate;

a mesh electrode located in opposition to said target section;

scanning beam emitting means including a cathode electrode, opposed to the mesh electrode and located on the side opposite to the target section with respect to the mesh electrode, for emitting an electron beam and means for scanning the electron beam; and a control electrode, insulated from the target section, for controlling a surface potential of a non-scanned region of the target section while the image pickup tube operates, the control electrode having a terminal for receiving a control voltage applied thereto externally of the control electrode;

wherein said photo-conductive film is made of an amorphous material mainly containing Se;

the method comprising the steps of applying to said control electrode of said image pickup tube a voltage lower than that to be applied to the target electrode, and applying to said photo-conductive film an electric field of $0.8\times10^6$ V/cm or more.

19. A method for operating an image pickup tube, the image pickup tube comprising:

a bulb with its one end opened;

a substrate for sealing the end of said bulb using an indium ring;

an image pickup tube target section including a target electrode formed on the substrate within said bulb and a photo-conductive film formed on said target electrode;

a mesh electrode located in opposition to said target section with said bulb; and scanning beam emitting means including a cathode electrode for emitting an electron beam and means for scanning the electron beam, said scanning beam emitting means being opposed to the mesh electrode and located on the side opposite to the target section with respect to the mesh electrode; and a control electrode for controlling a surface potential of a non-scanned region of the target section, said control electrode being located on the non-scanned region between said target section and said mesh electrode and electrically insulated from said target section and said mesh electrode, said control electrode having a terminal for receiving a control voltage applied thereto externally of said control electrode;

the method comprising the step of operating said image pickup tube under the following condition:

$$Vk<Vg<Vm\cdot(Lg/Lm), \text{ and}$$

$$Vg<Vt$$

where Vg represents a control electrode voltage, Vk represents a cathode electrode voltage, Vm represents a potential difference between the mesh electrode and the cathode electrode, Vt represents a potential difference between the target electrode and the cathode electrode, Lg represents the distance between the photo-conductive film and the control electrode, and Lm represents the distance between the photo-conductive film and the mesh electrode.

20. A method for operating the image pickup tube, the image pickup tube comprising:

a bulb with its one end opened;

a substrate for sealing the end of said bulb using an indium ring;

an image pickup tube target section including a target electrode formed on the substrate within said bulb and a photo-conductive film formed on said target electrode;

a mesh electrode located in opposition to said target section with said bulb; and scanning beam emitting means including a cathode electrode for emitting an electron beam and means for scanning the electron beam, said scanning beam emitting means being opposed to the mesh electrode and located on the side opposite to the target section with respect to the mesh electrode; and a control electrode for controlling a surface potential of a non-scanned region of the target section, said control electrode being located on the non-scanned region between said target section and said mesh electrode and electrically insulated from said target section and said mesh electrode, said control electrode having a terminal for receiving a control voltage applied thereto externally of said control electrode;

wherein said photo-conductive film is made of an amorphous material mainly containing Se;

the method comprising the steps of applying to said control electrode of said image pickup tube a voltage lower than that to be applied to the target electrode, and applying to said photo-conductive film an electric field of $0.8 \times 10^6$ V/cm or more.

* * * * *